United States Patent [19]

Edwards et al.

[11] Patent Number: 5,482,364
[45] Date of Patent: Jan. 9, 1996

[54] REPLACEMENT ENDLESS VEHICLE TRACKS

[75] Inventors: John W. Edwards, Arcadia; Daniel R. Harper; Quinton B. McNew, both of Ft. Myers, all of Fla.

[73] Assignee: Edwards, Harper, McNew & Company, Ft. Myers, Fla.

[21] Appl. No.: 106,569

[22] Filed: Aug. 16, 1993

Related U.S. Application Data

[63] Continuation-in-part of Ser. No. 926,521, Aug. 10, 1992, Pat. No. 5,368,376, which is a continuation-in-part of Ser. No. 749,896, Aug. 26, 1991, abandoned.

[51] Int. Cl.$^6$ ................................................. B62D 55/18
[52] U.S. Cl. ................................................. 305/39; 305/56
[58] Field of Search ........................... 305/35 R, 35 EB, 305/38, 39, 56, 57, 58 R, 58 PC, 40

[56] References Cited

U.S. PATENT DOCUMENTS

Re. 29,723  8/1978  Haslett et al. .
Re. 33,324  9/1990  Edwards et al. .

(List continued on next page.)

FOREIGN PATENT DOCUMENTS

| | | |
|---|---|---|
| 205109 | 12/1956 | Australia . |
| 248747 | 1/1964 | Australia . |
| 0118912 | 9/1984 | European Pat. Off. . |
| 0176675 | 9/1986 | European Pat. Off. . |
| 0304390 | 2/1989 | European Pat. Off. . |
| 798665 | 5/1936 | France . |
| 893727 | 10/1944 | France . |
| 60756 | 1/1955 | France . |
| 1117612 | 5/1956 | France . |
| 2378669 | 8/1978 | France . |
| 2378671 | 8/1978 | France . |
| 2471905 | 6/1981 | France . |

(List continued on next page.)

OTHER PUBLICATIONS

Fabricon 81 brochure, Vaennerflex™, "Cleated Conveyor Belting for Industry", pp. 1–17, Portland, Oregon.
MaCarthur Press (Books) Pty. Ltd., "Blackwoods General Catalogue", published in Australia in 1979, p. 841.
Caterpillar brochure, "CAT Challenger 65", Feb., 1987, 10 pages.
Caterpillar Brochure (undated), entitled "CAT Challenger 65 The Total Field Machine", 12 pages.
Mike Osenga, "Caterpillar's New Rubber–Tracked Farm Tractor", Mar. 1987, pp. 25–26, from Diesel Progress North American (magazine).
Caterpillar, "CAT Challenger 65", Dec. 1986, (brochure).
Caterpillar Publication No. PEDP008–01, "More Money Saving Ideas From Caterpillar".
Caterpillar Publication No. PECP6300, "Your Undercarriage Guide for Elevated Sprocket Track–Type Tractors".

*Primary Examiner*—Russell D. Stormer
*Attorney, Agent, or Firm*—Oliff & Berridge

[57] ABSTRACT

A replacement endless drive track for use on a heavy duty tracked vehicle such as a bulldozer or tank includes a reinforced polymeric drive belt, two parallel sets of closely spaced rail blocks adjacent the drive belt, a plurality of drive pins extending between opposing ones of the rail blocks, and supporting members adjoining the drive belt and the rail blocks. The rail blocks are substantially Z-shaped, such that a forward portion of one rail block is offset and overlaps the rearward portion of a directly adjacent rail block. The rail blocks, drive pins and drive treads may be comprised of a polymeric material which is harder than the polymeric material of the drive belt. The drive pins may alternatively be disposed at a lateral end of the supporting members to accommodate a tracked vehicle with peripherally disposed drive sprockets. In addition, the frame of the tracked vehicle may be adapted to provide for attachment of widened rollers which roll directly on the track for smoother and quieter travel. In an alternative manner, a conventional endless track may be modified to accommodate the widened rollers by fixing a plurality of supporting pads to the grousers of the endless track, the widened rollers riding directly on the supporting pads.

21 Claims, 22 Drawing Sheets

U.S. PATENT DOCUMENTS

| | | | |
|---|---|---|---|
| 1,420,531 | 6/1922 | Dutkiewicz et al. . | |
| 1,507,458 | 9/1924 | Dreyer . | |
| 1,970,756 | 8/1934 | Lamb . | |
| 1,973,214 | 9/1934 | Lamb . | |
| 2,022,567 | 11/1935 | Kegresse . | |
| 2,037,983 | 4/1936 | Johnston . | |
| 2,290,109 | 7/1942 | Mayne . | |
| 2,313,347 | 5/1943 | Mayne | 305/38 |
| 2,318,992 | 5/1943 | Gray . | |
| 2,350,076 | 5/1944 | Smith et al. . | |
| 2,385,453 | 9/1945 | Leguillon . | |
| 2,387,802 | 10/1945 | Mayne . | |
| 2,390,542 | 12/1945 | Knox . | |
| 2,409,502 | 10/1946 | Leguillon et al. | 305/35 R |
| 2,410,507 | 11/1946 | Knight . | |
| 2,449,950 | 9/1948 | Nassimbene . | |
| 2,458,755 | 1/1949 | Waller | 305/35 R |
| 2,461,850 | 2/1949 | Slemmons | 305/38 X |
| 2,487,813 | 11/1949 | Knox . | |
| 2,531,111 | 11/1950 | Daniels . | |
| 2,541,177 | 2/1951 | Slemmons . | |
| 2,647,023 | 7/1953 | Kubaugh . | |
| 2,728,612 | 12/1955 | Howe et al. . | |
| 2,732,265 | 1/1956 | Cuthbertson . | |
| 2,733,965 | 2/1956 | Gladden . | |
| 2,735,728 | 2/1956 | Powell . | |
| 2,803,504 | 8/1957 | Lynch . | |
| 2,815,988 | 12/1957 | Dowell et al. . | |
| 2,823,082 | 2/1958 | Bauer, Jr. . | |
| 2,845,308 | 7/1958 | Woltemar . | |
| 2,864,154 | 12/1958 | Sausaman . | |
| 2,984,120 | 5/1961 | Hurry . | |
| 3,013,844 | 12/1961 | Mazzarins . | |
| 3,019,062 | 1/1962 | Long . | |
| 3,105,390 | 10/1963 | Funke et al. . | |
| 3,118,709 | 1/1964 | Case . | |
| 3,223,462 | 12/1965 | Dalrymple . | |
| 3,250,577 | 5/1966 | Olson . | |
| 3,327,359 | 6/1967 | Wiese . | |
| 3,332,679 | 6/1967 | Katzenberger . | |
| 3,346,306 | 10/1967 | Siber . | |
| 3,439,959 | 4/1969 | Bowen et al. . | |
| 3,451,728 | 6/1969 | Bruneau . | |
| 3,480,339 | 11/1969 | Kell . | |
| 3,504,951 | 4/1970 | Hirych . | |
| 3,539,230 | 11/1970 | Comellas | 305/56 X |
| 3,567,291 | 3/1971 | Paulson . | |
| 3,576,352 | 4/1971 | Sato et al. . | |
| 3,587,617 | 6/1971 | Grawley . | |
| 3,618,384 | 11/1971 | Bierlein . | |
| 3,625,574 | 12/1971 | Plastino . | |
| 3,703,321 | 11/1972 | Schoonover . | |
| 3,717,391 | 2/1973 | Snellman et al. . | |
| 3,734,577 | 5/1973 | Snellman | 305/40 |
| 3,754,798 | 8/1973 | Chaumont . | |
| 3,758,171 | 9/1973 | Plastino . | |
| 3,771,844 | 11/1973 | Perreault . | |
| 3,808,901 | 5/1974 | Berg . | |
| 3,900,231 | 8/1975 | Ohm . | |
| 3,944,006 | 3/1976 | Lassanske . | |
| 3,955,855 | 5/1976 | Massieon et al. . | |
| 3,993,366 | 11/1976 | Orpana . | |
| 4,023,865 | 5/1977 | Morissette . | |
| 4,093,318 | 6/1978 | Edwards . | |
| 4,099,794 | 7/1978 | Hoffart . | |
| 4,108,502 | 8/1978 | Wohlford . | |
| 4,121,875 | 10/1978 | Stedman | 305/54 X |
| 4,123,120 | 10/1978 | Kohriyama . | |
| 4,128,277 | 12/1978 | Meisel, Jr. | 305/54 |
| 4,141,600 | 2/1979 | Orpana . | |
| 4,145,092 | 3/1979 | Kasin . | |
| 4,278,302 | 7/1981 | Westimayer et al. . | |
| 4,324,437 | 8/1982 | Narang . | |
| 4,359,248 | 11/1982 | Kortering . | |
| 4,455,053 | 6/1984 | Rasmussen . | |
| 4,470,641 | 9/1984 | Swarthout . | |
| 4,474,414 | 10/1984 | Tokue . | |
| 4,504,342 | 3/1985 | Marsh et al. . | |
| 4,522,452 | 6/1985 | Wohlford . | |
| 4,530,546 | 7/1985 | Meisel, Jr. . | |
| 4,548,665 | 10/1985 | Worcester . | |
| 4,569,561 | 2/1986 | Edwards et al. . | |
| 4,594,846 | 6/1986 | Livesay et al. . | |
| 4,595,385 | 6/1986 | Henderson . | |
| 4,611,860 | 9/1986 | Wohlford et al. . | |
| 4,616,883 | 10/1986 | Edwards et al. . | |
| 4,618,190 | 10/1986 | Garman et al. . | |
| 4,636,014 | 1/1987 | Dennison et al. . | |
| 4,642,080 | 2/1987 | Takano et al. . | |
| 4,687,261 | 8/1987 | Atkin . | |
| 4,844,560 | 7/1989 | Edwards et al. . | |
| 4,861,120 | 8/1989 | Edwards et al. . | |
| 4,884,852 | 12/1989 | Edwards et al. . | |
| 4,904,030 | 2/1990 | Ono . | |
| 4,906,054 | 3/1990 | Edwards et al. . | |
| 5,005,921 | 4/1991 | Edwards et al. . | |
| 5,005,922 | 4/1991 | Edwards et al. . | |
| 5,020,865 | 6/1991 | Edwards et al. . | |
| 5,040,282 | 8/1991 | Edwards et al. . | |
| 5,069,509 | 12/1991 | Johnson et al. . | |

FOREIGN PATENT DOCUMENTS

| | | | |
|---|---|---|---|
| 2486482 | 1/1982 | France . | |
| 533398 | 7/1931 | German Dem. Rep. . | |
| 473073 | 3/1929 | Germany . | |
| 928669 | 6/1955 | Germany . | |
| 1480757 | 7/1969 | Germany | 305/54 |
| 3319067 | 11/1984 | Germany . | |
| 3823571 | 1/1990 | Germany . | |
| 9012707 | 1/1991 | Germany . | |
| 3920003 | 1/1991 | Germany . | |
| 52-2924 | 1/1977 | Japan . | |
| 55-55063 | 4/1980 | Japan . | |
| 55-119572 | 9/1980 | Japan . | |
| 57-144175 | 9/1982 | Japan . | |
| 0654479 | 3/1979 | U.S.S.R. . | |
| 106353 | 5/1917 | United Kingdom . | |
| 223515 | 10/1924 | United Kingdom . | |
| 649378 | 1/1951 | United Kingdom . | |
| 721141 | 12/1954 | United Kingdom . | |
| 781165 | 8/1957 | United Kingdom | 305/38 |
| 2014015 | 3/1983 | United Kingdom . | |
| WO85/02824 | 7/1985 | WIPO . | |
| 89/08577 | 9/1989 | WIPO . | |
| 91/19634 | 12/1991 | WIPO . | |

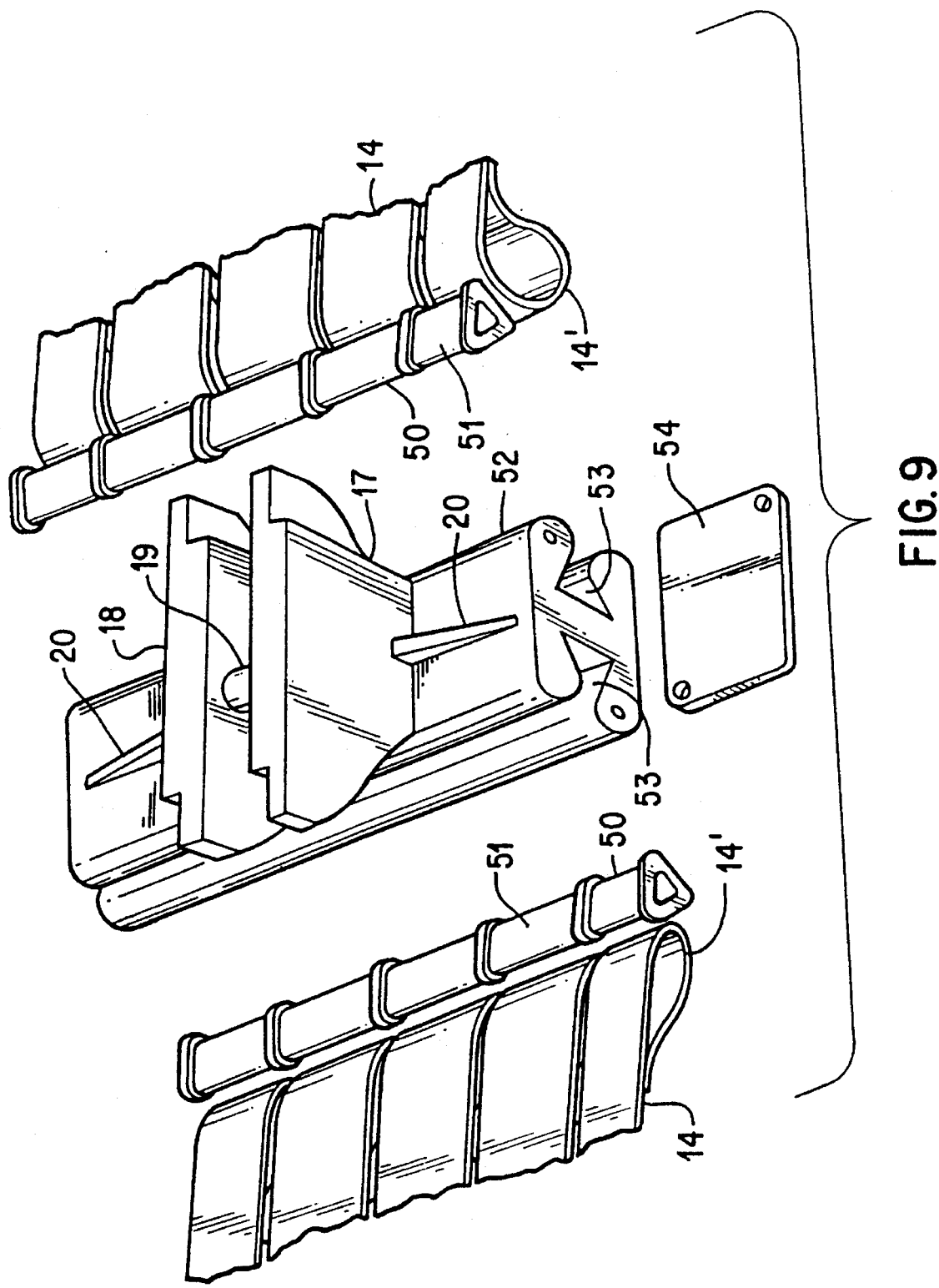

REPLACEMENT ENDLESS VEHICLE TRACKS

This is a Continuation-in-Part of Application No. 07/926,521, filed Aug. 10, 1992 now U.S. Pat. No. 5,368,376 which in turn is a Continuation-in-Part of application Ser. No. 07/749,896 filed Aug. 26, 1991 (now abandoned).

BACKGROUND OF THE INVENTION

The present invention relates to a replacement endless track for a heavy duty tracked vehicle. Endless tracks are used on heavy duty vehicles such as tractors, bulldozers, and tanks. As shown in FIG. 1, such a vehicle includes an endless track drive system 2 made up of a closed loop endless track 3 in conjunction with the necessary sprocketed drive wheel 4 and any necessary supporting wheels, such as opposite end wheel 5 and idler wheels or rollers 6. The endless track is installed so as to pass around the wheels 4, 5 and 6. Of course, the tracked vehicle is further equipped with the necessary power source and controls to power the endless track drive system and thereby propel the vehicle over varying terrain as desired.

As seen in FIG. 2, one conventional endless track 3 consists of two parallel rails 7 each comprised of a plurality of rail blocks 7' linked together and supporting a plurality of metal grousers 8. Metal drive pins 9 between opposing rail blocks are engaged by the drive wheel sprocket to propel the vehicle. Drive pins 9 are typically driven into and retained by press fittings 10 in the rail blocks. Replaceable protective metal bushings 9' may be provided around drive pins 9 to protect the drive pins from wear, and a lubricant may be injected between drive pins 9 and bushings 9' from reservoirs in drive pins 9 to reduce friction. Examples of this type of track are disclosed, for example, in U.S. Pat. Nos. 2,823,082; 3,734,577; 3,955,855; 4,359,248; and 4,530,546. See also Catepillar's Sealed and Lubricated Track brochure.

As seen in FIG. 2A, another conventional track 3A consists of a plurality of central guide members 7A and a plurality of metal grousers 8A. The grousers 8A are held together by a plurality of drive units 9A disposed on the peripheral edges of the track 3A. The drive units 9A are engaged by drive wheel sprockets to propel the vehicle. Each drive unit 9A includes a pair of laterally extending pins 10A and a connecting member 12A. Laterally extending pins 10A of adjacent grousers are fitted into one of connecting members 12A.

The above-referenced conventional tracks have the disadvantages of being noisy and vibration prone, not sufficiently durable and/or not usable on road surfaces. This is because of the conventional configurations and use of metal parts. Accordingly, substantial efforts have been made to construct quieter, smoother operating and more durable tracks for tracked vehicles of rubber, polyurethane or other polymeric materials. See, e.g., Applicants' own U.S. Pat. Nos. 4,093,318; 4,569,561; 4,616,883; Re. 33,324; 4,844,560; 4,861,120; 4,884,852; 4,906,054; 5,005,921; 5,005,922; 5,020,865; and 5,040,282 (fully incorporated herein by reference). See also, e.g., U.S. Pat. No. 4,904,030 and PCT Publication No. WO 85/2824. However, these tracks and tracks like them suffer from the disadvantage that direct replacement of the above-described conventional metal tracks is not possible. In other words, some modification of the conventional tracked vehicle is necessary in order to accommodate these polymeric tracks. Moreover, further improvements in durability are still needed.

Thus, there remains a need for replacement endless vehicle tracks which overcome the foregoing problems.

SUMMARY OF THE INVENTION

Accordingly, the present invention has been developed to overcome the foregoing shortcomings of previous endless vehicle tracks.

It is therefore an object of the present invention to provide a replacement endless vehicle track which can be substituted for a conventional track without modification (or without significant modification) of the tracked vehicle.

It is yet another object of the present invention to provide a replacement endless vehicle track which substantially reduces noise, vibration and wear, which has a substantially longer useful life, and which renders the tracked vehicle usable on paved roadways in addition to other terrains.

It is yet another object of the present invention to provide a replacement endless vehicle track which can be easily and quickly installed on existing tracked vehicles.

Thus, in accordance with one aspect of the present invention, the shortcomings of existing endless vehicle tracks are overcome by an endless vehicle track comprising a polymeric drive belt having a central longitudinal axis and first and second surfaces; a plurality of closely spaced first rail blocks adjacent the first surface of the drive belt along a line parallel to the central longitudinal axis; a plurality of closely spaced second rail blocks adjacent the first surface of the drive belt along a line parallel to but across the central longitudinal axis from the plurality of first polymeric rail blocks; a plurality of drive pins respectively extending between opposing ones of said first and second rail blocks; and a plurality of drive treads adjacent the second surface of the drive belt.

In accordance with another aspect of the present invention, a plurality of supporting members are provided, substantially perpendicular to the central longitudinal axis. At least one reinforcement member may be disposed through the supporting members and within the drive belt substantially parallel to the central longitudinal axis, the first and second rail blocks being secured to the supporting members, and the drive treads being formed on the supporting members. Each supporting member is alternatively a one-piece construction or includes detachable drive belt and tread portions.

In accordance with yet another aspect of the present invention, each of the rail blocks includes a forward portion and a rearward portion, the forward portion of one rail block being offset from and overlapping the rearward portion of a directly adjacent rail block.

In accordance with still another aspect of the present invention, the drive treads may be comprised of a polymeric material which is harder than a polymeric material of the drive belt. The rail blocks and drive pins may also be comprised of a polymeric material which is harder than the polymeric material of the drive belt.

In accordance with still further aspects of the present invention, the rail blocks are comprised of metal. The drive pins may include metal outer protective bushings, and the bushings and rail blocks may be coated with a polymeric material. A lubricant may be provided between the drive pins and the bushings. A sealing member and/or an O-ring located inwardly of the sealing member may be provided to seal in the lubricant.

In accordance with yet a further aspect of the present invention, the drive belt either may be cable reinforced or polyester reinforced. More specifically, the drive belt may be reinforced with polyester belts.

In accordance with yet further aspects of the present invention, the drive belt is either integrally molded with the drive treads or is bolted to the drive treads; the drive treads lie under and vertically support each of the rail blocks or longitudinally alternating ones of the rail blocks; and a longitudinal width of the drive treads is approximately equal to a longitudinal width of portions of the rail blocks abutting the drive belt.

In accordance with yet further aspects of the present invention, the supporting members may be metal; abutting ends of the endless vehicle track may be joined with a master link; and the master link may comprise a pair of rail blocks and a drive pin between the rail blocks.

In accordance with yet another aspect of the present invention, an endless track drive system for a tracked vehicle includes the foregoing endless vehicle track in conjunction with a sprocket for engaging with the drive pins and driving the tracked vehicle. The endless track drive system may also include at least one supplemental sprocket for engaging with the supporting members, a supplemental drive wheel for frictionally engaging with the tops of the rail blocks and/or a supplemental drive wheel for frictionally engaging with the first surface of the drive belt, to thereby further drive the tracked vehicle. In addition, the endless track drive system may include an apparatus for adapting a frame of the tracked vehicle to provide for attachment of widened rollers which are adapted to ride directly on the first surface of the drive belt.

In accordance with still another aspect of the present invention, an endless vehicle track includes a polymeric drive belt having a central longitudinal axis and first and second surfaces; a plurality of supporting members substantially perpendicular to the central longitudinal axis and connected to the drive belt, a lateral end portion of each of the supporting members including a drive pin with an outer protective bushing for engagement with a drive sprocket, and a lubricant provided between the drive pin and the outer protective bushing. The lateral end portion includes a cut out portion and a detachable end cap, and the drive pin is press fitted into apertures in the cut out portion and the end cap such that the bushing is free to rotate within the cut out portion and is engageable with the drive sprocket. At least one guide member is attached to each of the supporting members at central locations thereon.

In accordance with another aspect of the present invention, an endless vehicle track includes at least one metal grouser and a pair of parallel rails, each of the rails including a plurality of rail blocks. The metal grouser is fixed to ones of the rail blocks. The endless vehicle track further includes at least one roller for guiding the track and at least one supporting pad fixed to the metal grouser, the roller riding on the supporting pad. The supporting pad can be formed of polyurethane or some other polymeric material, and can be fixed to the grouser by molding or with bolts. At opposite ends of the pad are a tapered slot and a tab member, respectively. In a related embodiment, a supporting pad is adapted to be fixed to a grouser of a conventional endless track. The supporting pad supports a roller that guides the track.

These and other aspects and advantages of the present invention are described in or appear from the following detailed description of the preferred embodiments.

BRIEF DESCRIPTION OF THE DRAWINGS

The preferred embodiments are described with reference to the drawings in which:

FIG. 9 is a master link for use in conjunction with the endless vehicle track of the present invention;

DESCRIPTION OF THE PREFERRED EMBODIMENTS

Figure 2:
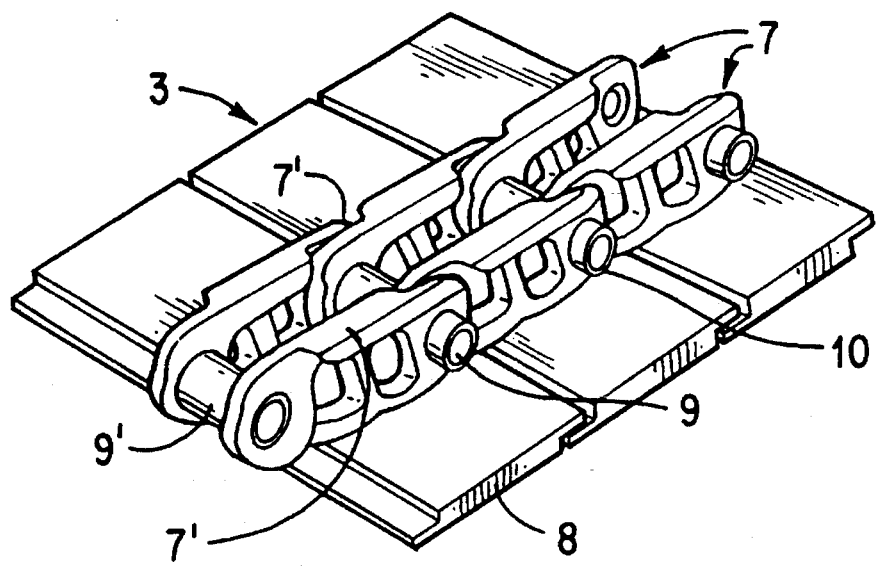
FIG. 2 is a partial enlarged view of the conventional rail-type endless vehicle track of FIG. 1.
Figure 2A:
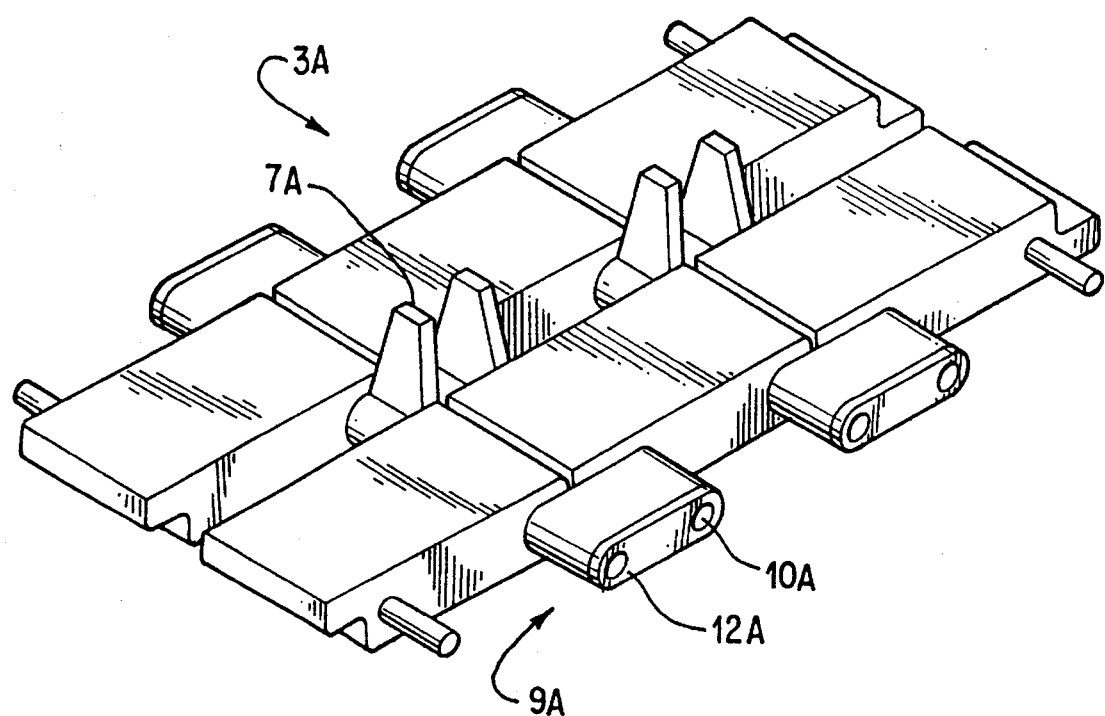
FIG. 2A is a partial enlarged view of an alternative conventional endless vehicle track.
Figure 3:
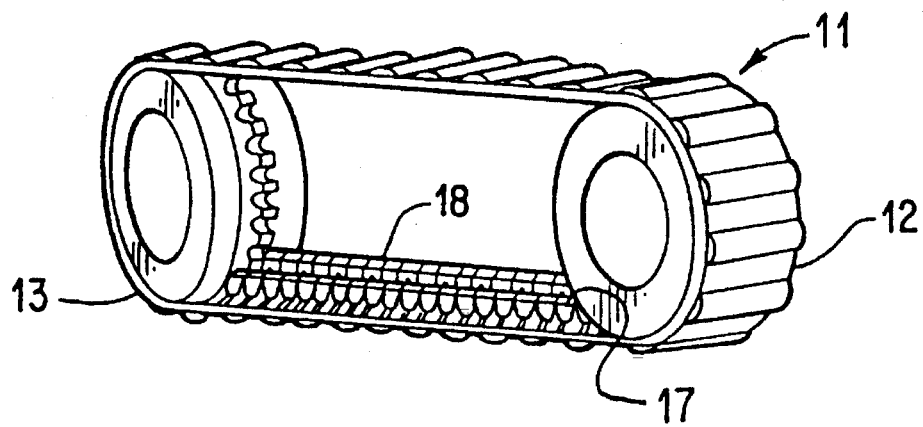
FIG. 3 is a perspective view of the replacement endless vehicle track in accordance with the present invention.
Figure 4:
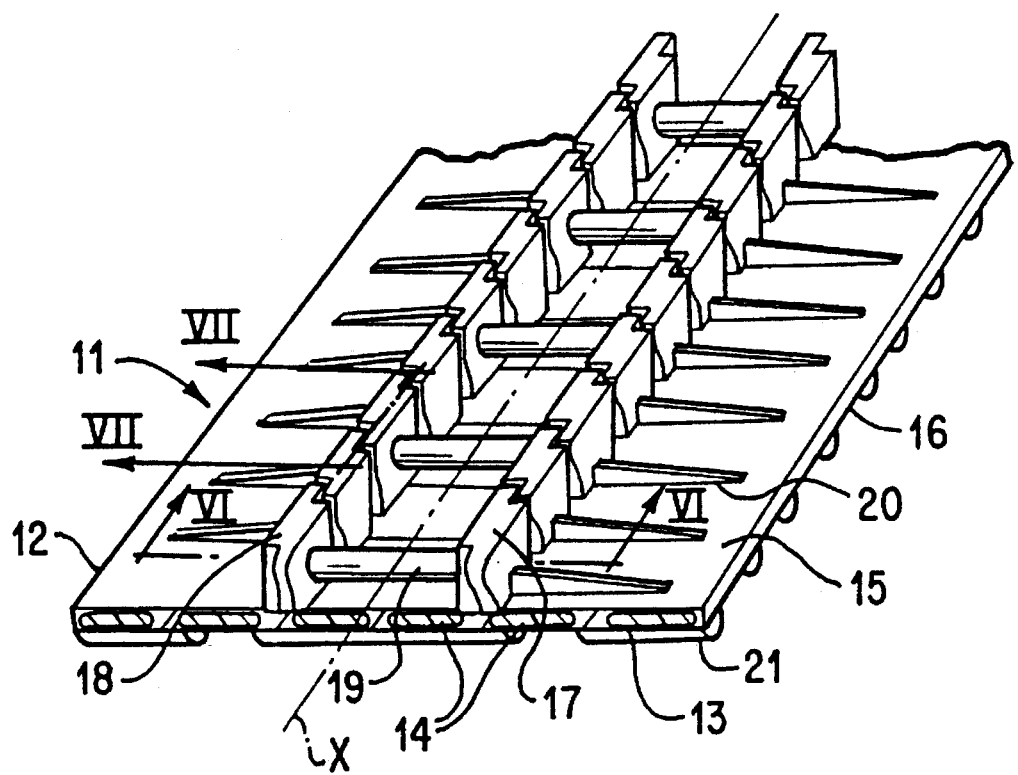
FIG. 4 is a partial enlarged view of the replacement endless vehicle track of the present invention.

FIGS. 3 and 4 depict an endless vehicle track 11 in accordance with the present invention. This track is to be used as a direct replacement for the conventional rail-type track depicted in FIGS. 1 and 2. Accordingly, a pair of such tracks are to be installed on a tracked vehicle, such as the bulldozer depicted in FIG. 1.

Each endless vehicle track 11, when installed, comprises a continuous, closed loop structure 12 constructed of a polymeric material. The polymeric structure is preferably molded, but may be constructed in other ways. The polymeric structure may be formed of any polymeric material which will provide a durable, sprocket-driven track with limited operational noise; examples are rubber, polyurethane or other plastics. One specific example is B-839 polyurethane manufactured by Uniroyal Chemical Company.

Polymeric structure 12 includes a polymeric drive belt 13, preferably reinforced with reinforcement members 14. Drive belt reinforcement members 14 are preferably KEVLAR belts, but also may be cables, cords or belts made of steel, other metals, nylon, polyester, or other high strength, light weight materials. Drive belt 13 has a central longitudinal axis X, and first and second surfaces 15 and 16.

A first set of closely spaced rail blocks 17 are fixed to the first surface of the drive belt 13 along a line parallel to the central longitudinal axis X. A second set of closely spaced rail blocks 18 are fixed to the first surface of the drive belt 13 along a line parallel to but across central longitudinal axis X from the first set of rail blocks. A plurality of drive pins 19 respectively extend between opposing ones of the first and second rail blocks.

A plurality of supporting members or braces 20 preferably respectively adjoin the drive belt and the rail blocks 17, 18. The supporting members may fully extend from the rail blocks to the lateral edge of the track, or they may be truncated short of the lateral edge of the track. They may have a constant height, or may be tapered as shown. They may have sharp or rounded edges and ends. As described more fully below, each of the rail blocks and/or supporting members may include a locking member for positively locking the rail blocks 17, 18 and/or the supporting members 20 into fixed positions with respect to the drive belt.

Figure 5A:
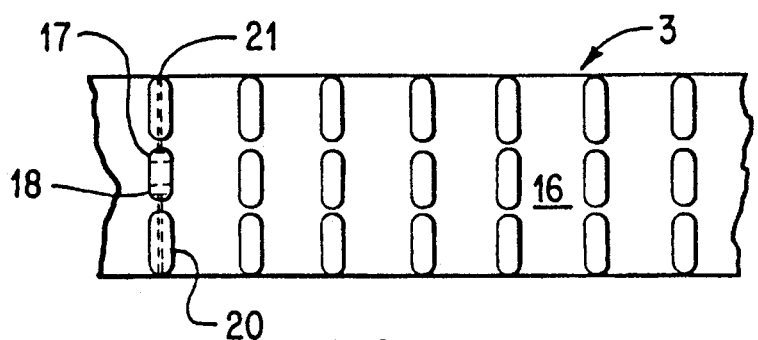
FIGS. 5A–5C depict various tread configurations which may be used on the endless vehicle track of FIG. 3.
Figure 5B:
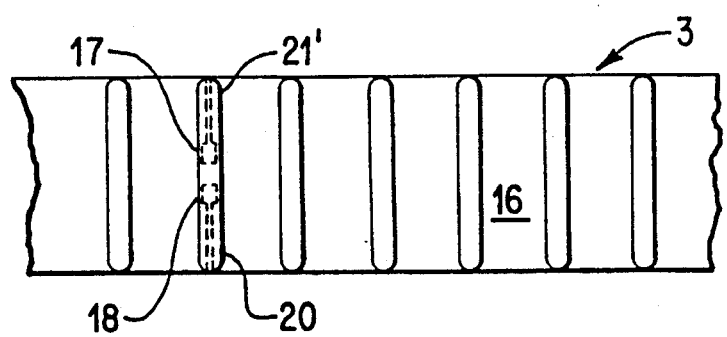
Figure 5C:
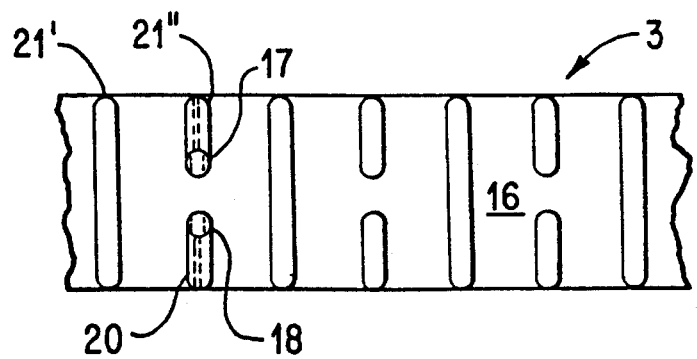

A plurality of drive treads 21 are fixed to the second surface 16 of the drive belt 13. For optimum support, drive treads should be provided directly under each of the rail blocks 17, 18 and their supporting members 20. However, drive treads may be provided under less than all of the rail blocks and supporting members such as, for example, under longitudinally alternating pairs of the rail blocks and supporting members. FIGS. 5A–5C depict three possible tread configurations. In the design of FIG. 5A (also shown in FIG. 4), each tread consists of three equal sized tread portions 21. In this design, the central tread portion supports a laterally opposed pair of rail blocks 17, 18, whereas the outer tread portions support the corresponding supporting members 20. In the design of FIG. 5B, each tread 21' extends substantially the full lateral width of the endless vehicle track. In the design of FIG. 5C, every other tread 21' extends substantially the full lateral width of the track, whereas intervening treads 21" extend only under the corresponding rail block and supporting member, with a space there-between corresponding to the space between opposed rail blocks 17, 18. Other possible tread designs will be apparent to persons skilled in the art.

Figure 1:
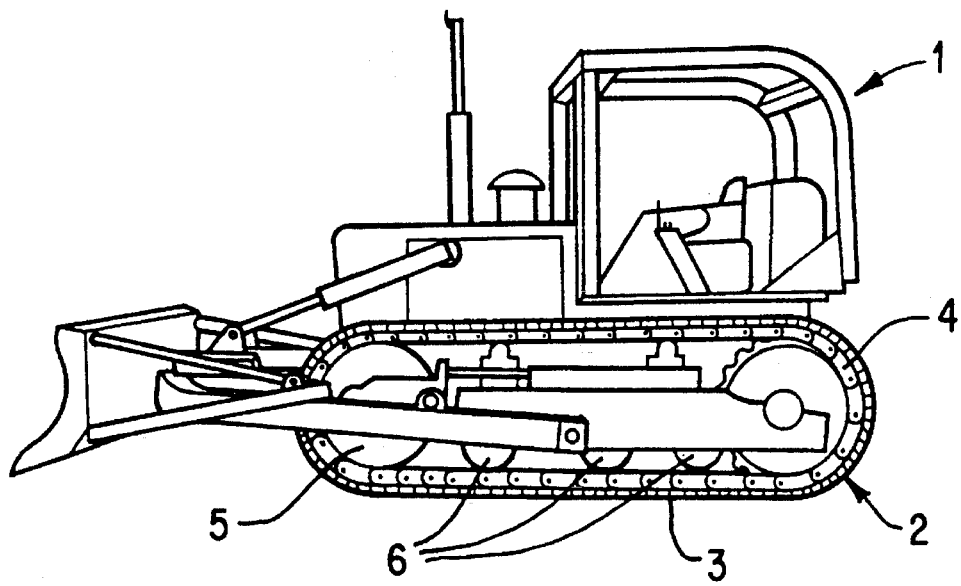
FIG. 1 is a perspective view of a bulldozer equipped with a conventional sprocket driven rail-type endless vehicle track.

In order for the endless vehicle track 11 to be a direct replacement for the conventional rail-type track depicted in FIGS. 1 and 2, drive pins 19 must be spaced the same distance apart as drive pins 9 of the conventional track. In the disclosed embodiment, rail blocks 17, 18 are sized and disposed on drive belt 13 such that two adjacent rail blocks 17 or 18 have the same longitudinal length as one of the rail blocks 7' of the conventional track. Accordingly, inclusion of drive pins 19 between every other pair of rail blocks 17, 18 ensures that the spacing between drive pins 19 is equal to the spacing between drive pins 9 of the conventional track.

Figure 6A:
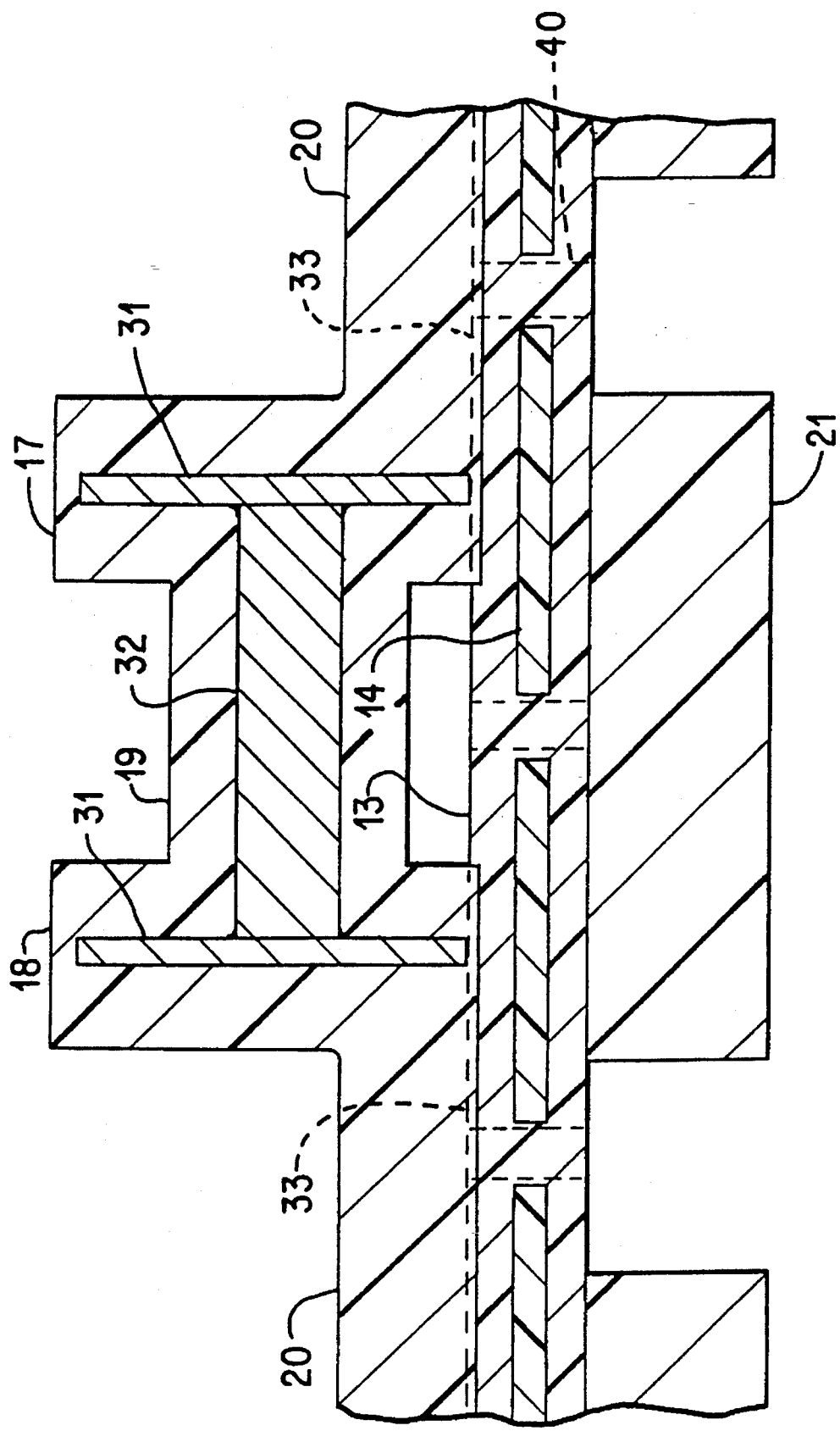
FIGS. 6A–6E are alternative lateral cross sections of the endless vehicle track of the present invention, taken along the line VI—VI of FIG. 4.
Figure 6B:
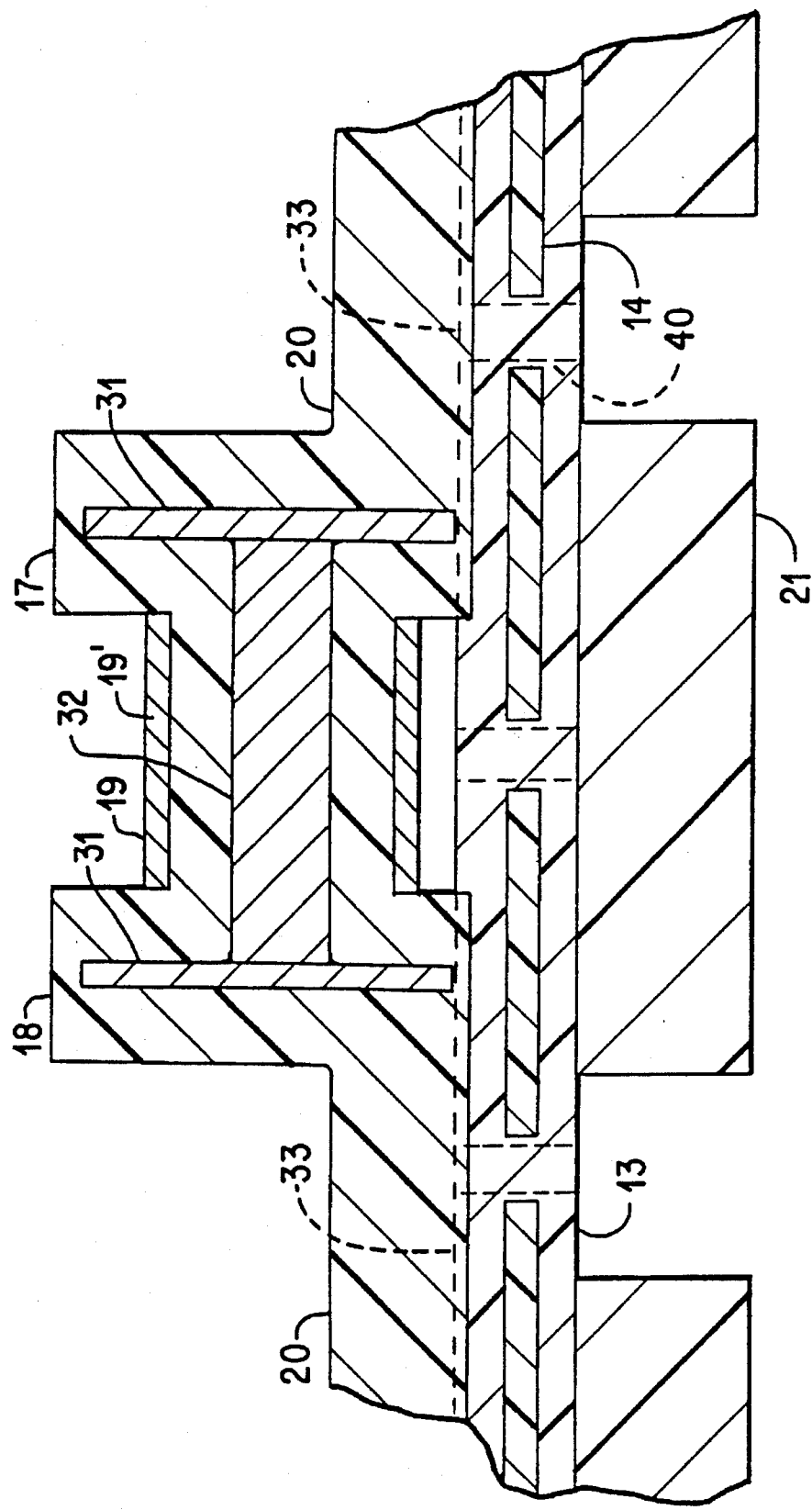
Figure 6C:
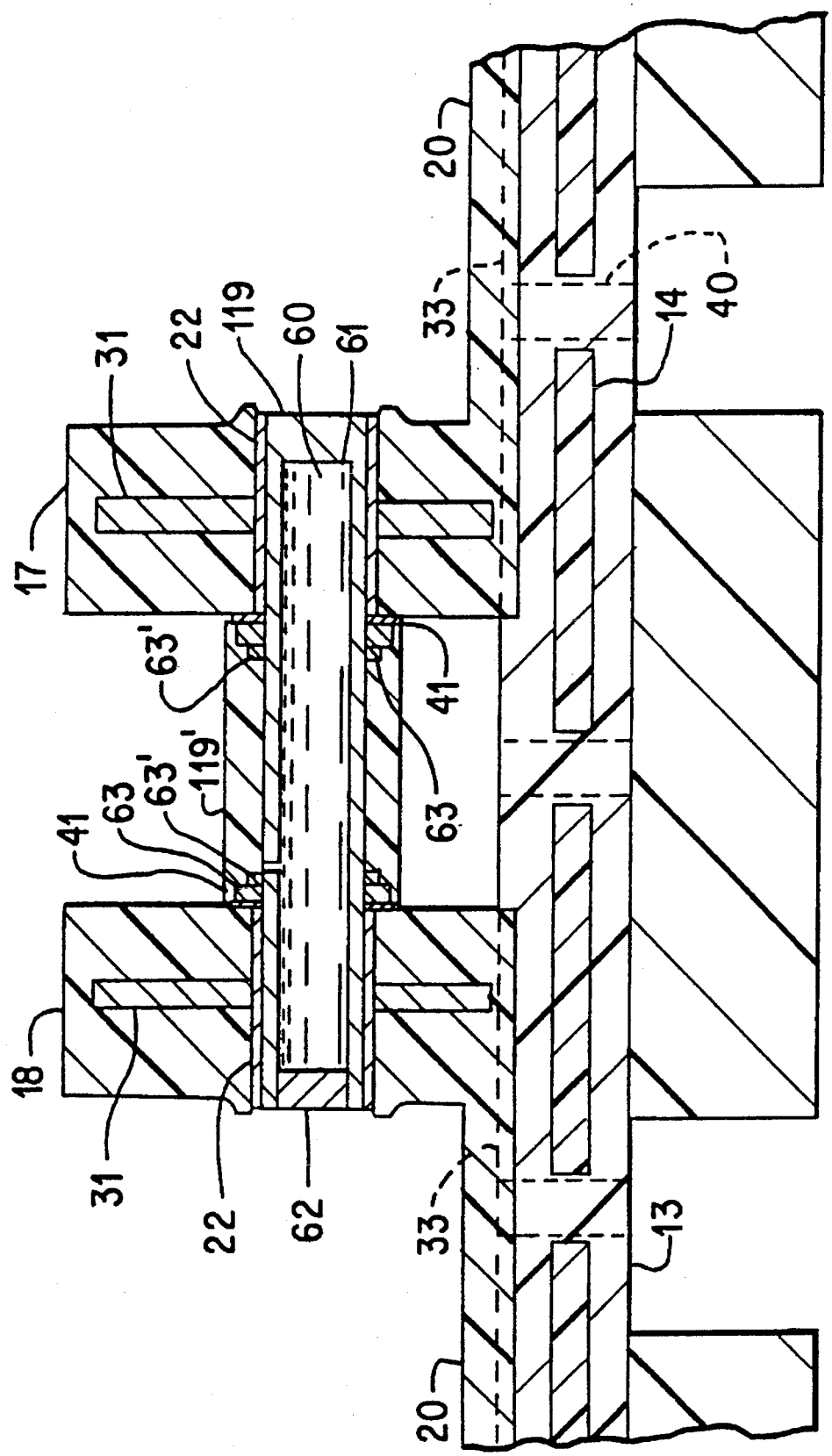
Figure 6D:
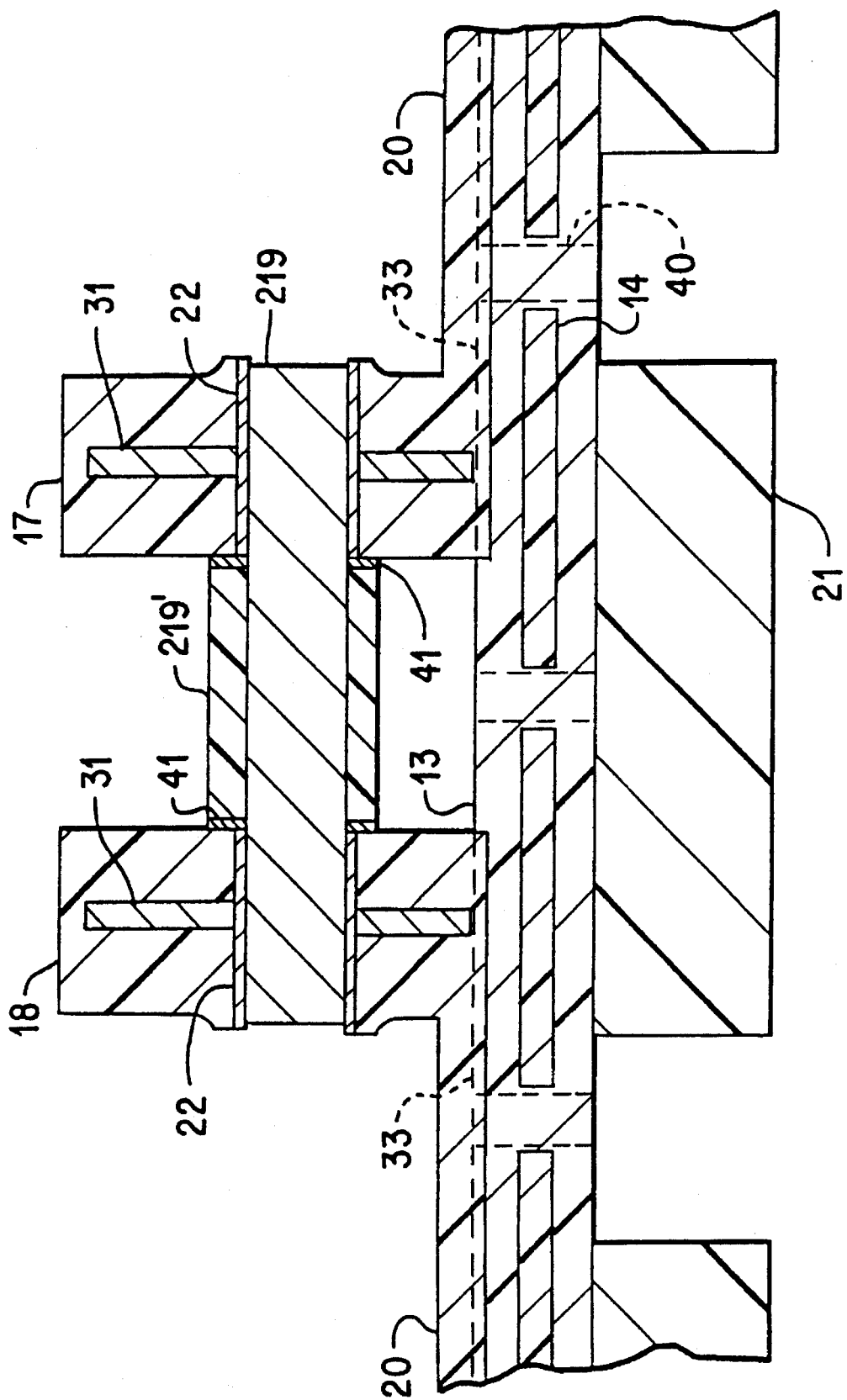
Figure 6E:
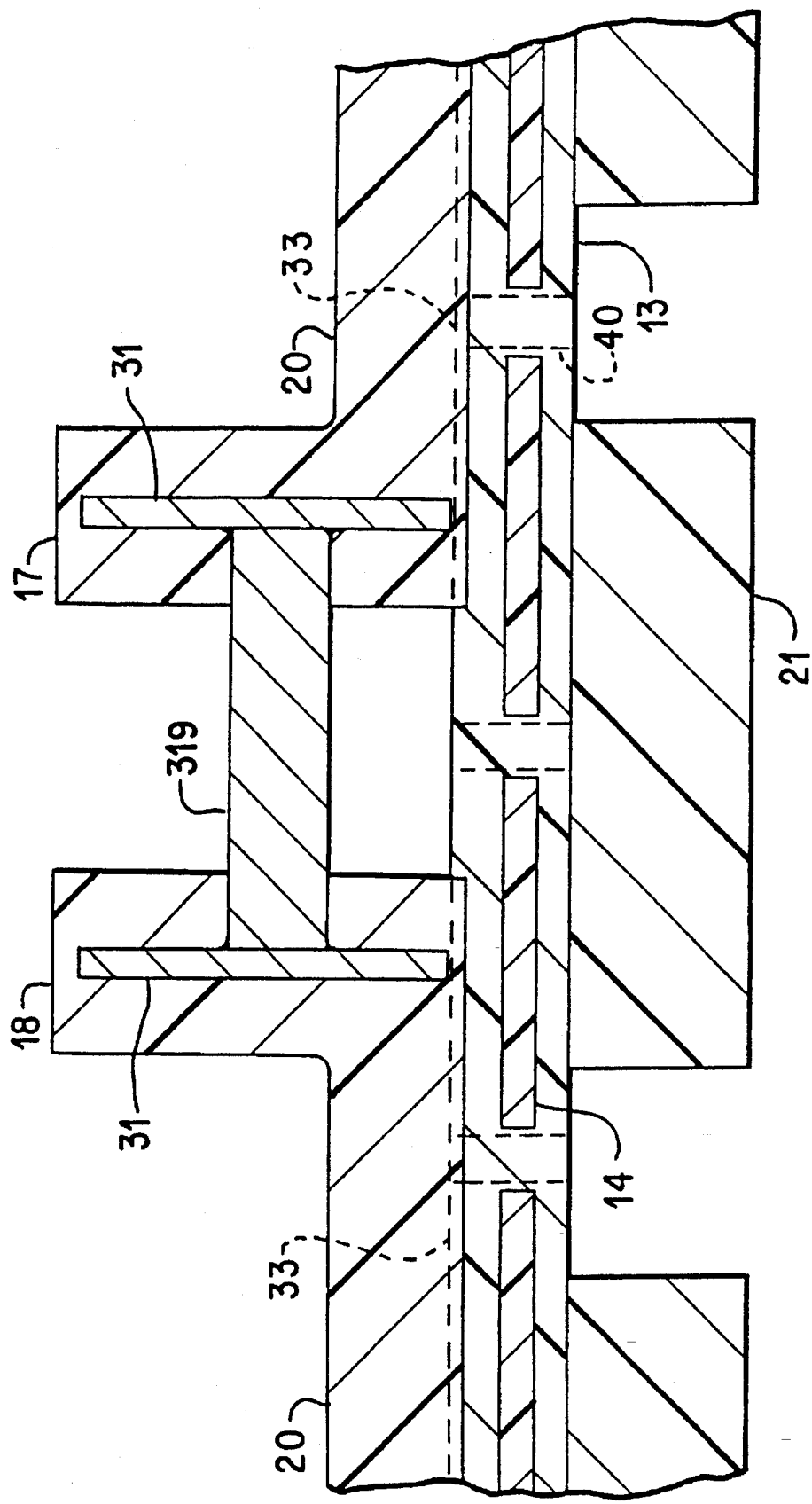
Figure 7B:
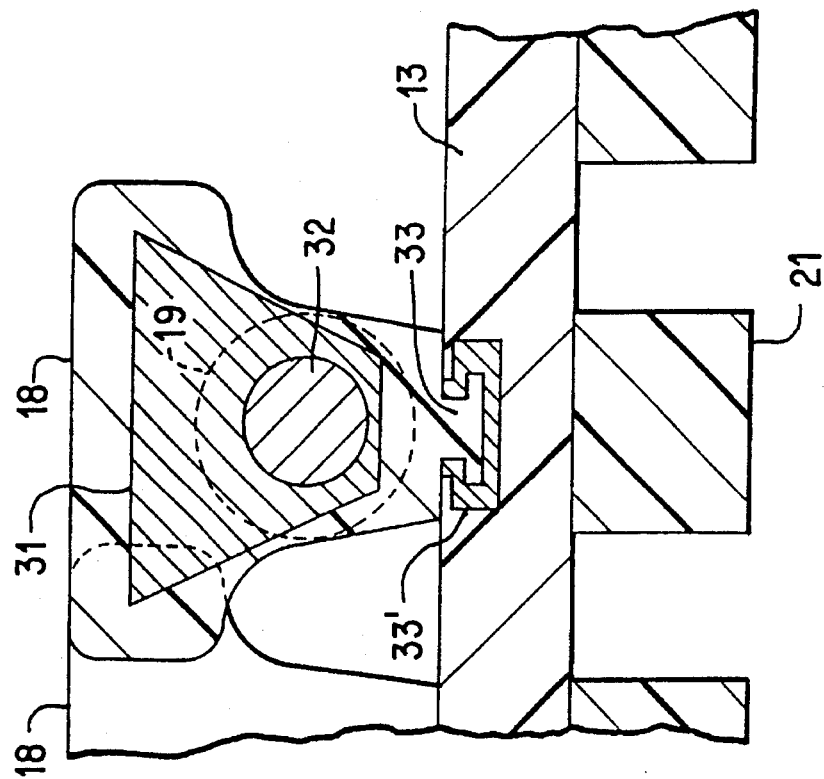
FIGS. 7A and 7B are alternative longitudinal cross sections of the endless vehicle track of the present invention taken along the line VII—VII of FIG. 4.
Figure 7A:
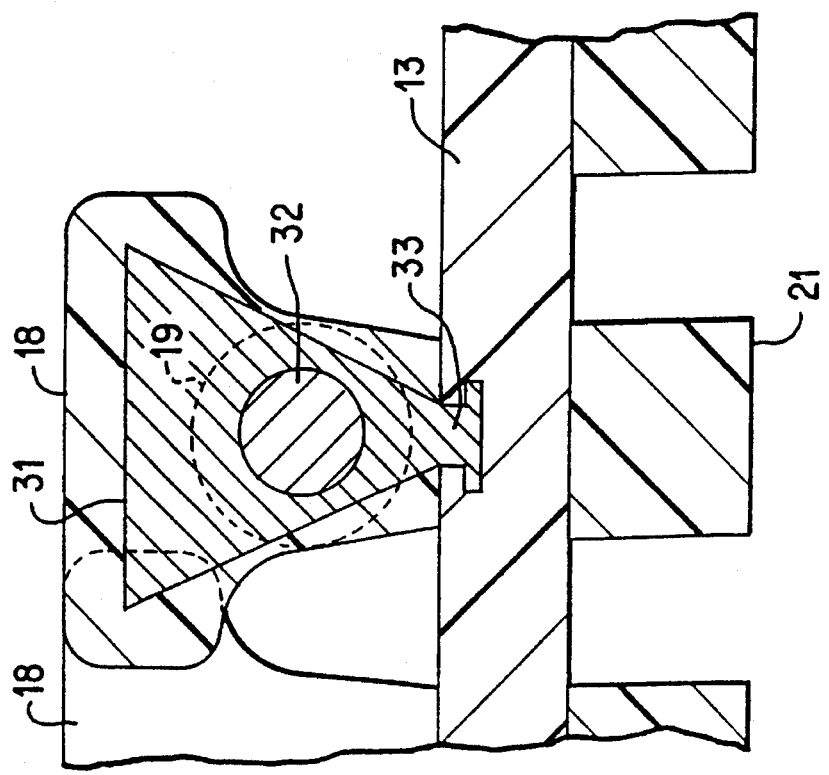
Figure 8:
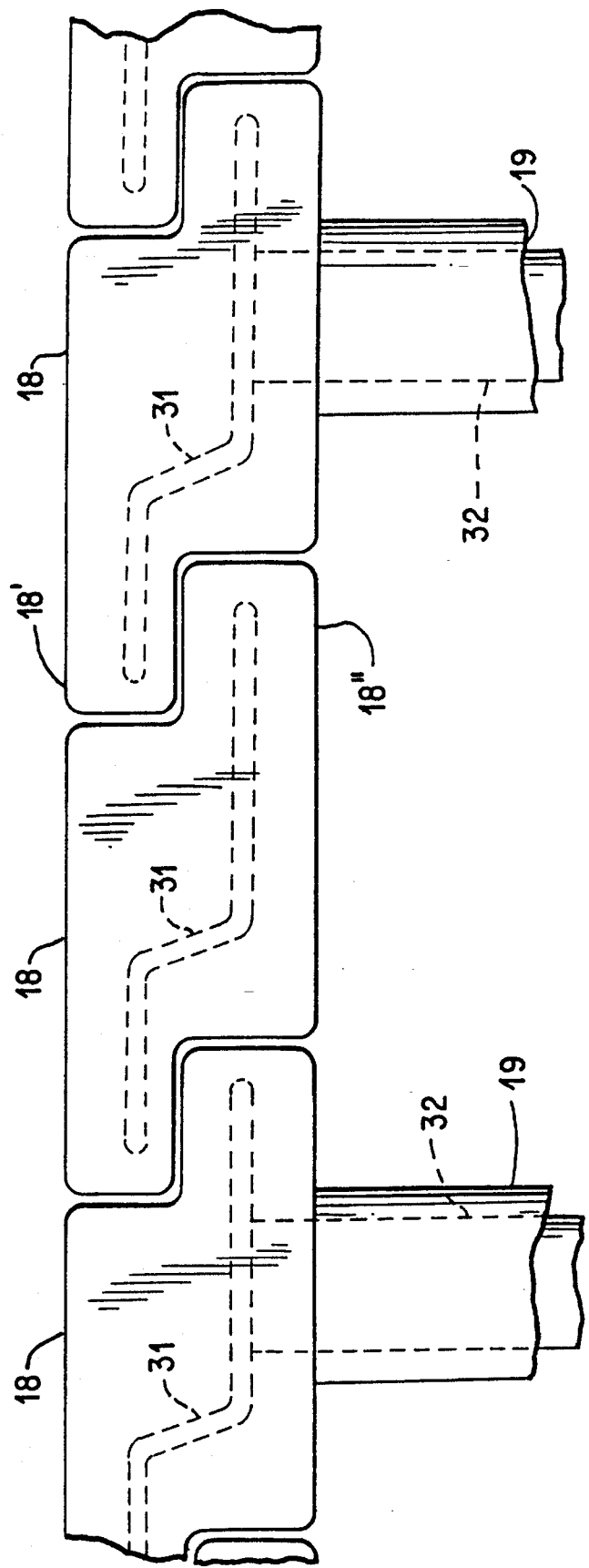
FIG. 8 is a partial plan view of the endless vehicle track of the present invention.

As can be seen in FIGS. 6–8, rail blocks 17, 18 and drive pins 19 may include reinforcing structure made of steel, other metals, high strength polyurethane, or similar high strength material. For example, rail blocks 17, 18 may be reinforced with ¼-inch steel plates 31 welded to a ¾-inch steel rod 32 extending through a ½-inch coating of polymeric material comprising drive pin 19. T-shaped locking members 33 may also be provided which extend into drive belt 13 and positively lock the respective rail blocks 17, 18 into fixed positions with respect to the drive belt 13. T-shaped members 33 preferably extend beneath rail blocks 17, 18 and supporting members 20, but may extend only beneath rail blocks 17, 18. T-shaped members 33 may be formed as extensions of metal plates 31 as shown in FIG. 7A, or as extensions of polyurethane rail blocks 17, 18 as shown in FIG. 7B. In either case, drive belt 13 may be directly molded around the T-shaped members as further shown in FIG. 7A, or metal or polyurethane female receptacles 33' may be incorporated into drive belt 13. In the latter case, rail blocks 17, 18 and/or supporting members 20 may be slid into receptacles 33' and retained in place with appropriate end caps and fasteners, similar to those described below with reference to FIG. 9.

Although the drive pins 19 are shown in FIG. 6A as being constructed of a polymeric coated steel rod, it will be appreciated that the drive pins may be constructed in any way sufficient to accommodate the forces imposed by the sprocket and to ensure against undue wear. Thus, as shown in FIG. 6B, the drive pins 19 of FIG. 6A may include a metal (e.g., steel) or high strength polymeric (e.g., polyurethane) or polymeric coated metal bushing 19'. Bushing 19' may be stationary or may rotate to further reduce wear. If stationary, bushing 19' may be extended into rail blocks 17, 18 and welded to plates 31 within the rail blocks. The drive pins also may be constructed of steel without a polymeric coating as shown as element 319 in FIG. 6E.

As shown in FIGS. 6C and 6D, the drive pins may alternatively comprise metal pins 119, 219 which extend through holes in rail blocks 17, 18 and reinforcing plates 31, are retained within press fittings 22, and are protected against wear by polymeric or metal (or polymeric coated metal) bushings 119', 219'. The bushings preferably rotate to further reduce wear, and washers 41 are preferably provided to reduce friction between the bushings and the rail blocks. The spaces between the drive pins and bushings may be unlubricated as shown in FIG. 6D, or a lubricant 60 may be provided between the drive pins and bushings from reservoirs 61 in the drive pins as shown in FIG. 6C. In that event, relatively high compression lubricant seals 63 (of rubber or other sealing material) should be provided in the ends of the bushings. O-rings 63' (of rubber or other sealing material) may also be provided inside seals 63 to provide auxiliary sealing in the event of failure of seals 63. Reservoirs 61 may be permanently sealed so as to require no replenishing of lubricant (see, e.g., FIG. 13), or reservoirs 61 may be periodically refilled by removal of a cap 62 or through a lubricating fitting (not shown) in the cap or end of the drive pin.

As is evident from FIG. 8, each of rail blocks 17, 18 is substantially Z-shaped such that a forward portion of one rail block (18' as shown) is offset from and overlaps a rearward portion of a directly adjacent rail block (18" as shown). This permits the adjacent rail blocks to move with respect to one another as the endless vehicle track flexes, while at the same time permitting rims of the drive sprocket or drive wheel to smoothly ride upon the tops of rail blocks 17, 18. This configuration of the rail blocks also prevents undue accumulation of dirt and debris between the drive pins and the sprocket.

Although the entire endless vehicle track may be constructed of a single polymeric material, in order to simultaneously optimize the integrity and durability of the structural members and the flexibility of the drive belt it is preferable to construct the rail blocks, drive pins (including any bushings) and supporting members of a polymeric material which is harder than the polymeric material of the drive belt. For similar reasons, the drive treads may also be made of a polymeric material which is harder than the polymeric material of the drive belt. Thus, for example, the rail blocks, drive pins, supporting members and drive treads may be made of PET-75-D polyurethane manufactured by Air Products Company, whereas the drive belt may be made of B-839 polyurethane manufactured by Uniroyal Chemical Company.

Figure 11:
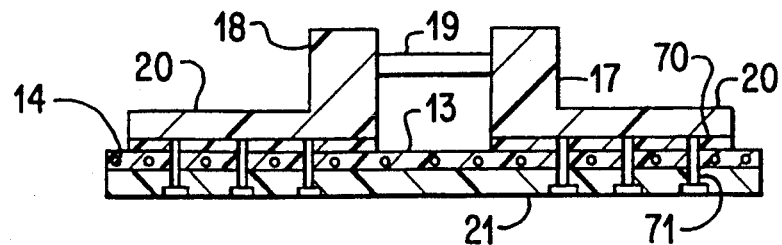
FIG. 11 depicts an alternative construction for the present invention.

In the manufacture of the endless vehicle track of the present invention, the drive belt and drive treads may be integrally molded with the rail blocks, drive pins and supporting members, whether the various components are made of a single polymeric material or different polymeric materials. Alternatively, the drive belt and drive treads may be bolted to the rail blocks and/or supporting members as shown in FIG. 11. In the latter case, threaded steel plates 70 may be installed in the rail blocks and/or supporting members to receive and retain the bolts 71.

The endless vehicle track may be molded without reinforcing structure 31, 32, 33 and/or 33', or by ensuring that the reinforcing structure is suspended in the mold along with reinforcement members 14 prior to injection of the polymeric material. If the various components of the endless vehicle track are all made of a single polymeric material, the track may be formed in a single molding step. If the various components of the track are made of different polymeric materials, the track may be formed in single or multiple molding steps. In the former case, for example, specified quantities of the different materials may be simultaneously injected into different parts of the mold. In the latter case, for example, the rail blocks, drive pins, supporting members and drive treads may be first integrally molded of a relatively hard polyurethane material with the drive treads connected to the rail blocks and supporting members with lugs 40 as shown in FIG. 6A, while leaving space for subsequent injection of the polymeric material for the drive belt. In a subsequent step, the drive belt is then molded of a relatively soft polyurethane material which integrates with or bonds to the harder polyurethane material of the rail blocks, drive pins, supporting members and drive treads. Since connecting lugs 40 extend only between the rail blocks/supporting members and the drive treads, drive belt 13 is free to fully flex between adjacent rail blocks/supporting members.

The endless vehicle track of the present invention may be molded in a closed loop for installation on the tracked vehicle. Alternatively, to make installation of the track easier and quicker, the endless track may have two abutting ends joined together by a master link such as disclosed in FIG. 9. In this case, ends of reinforcing belts 14 are folded back during the molding process to leave reinforcing belt loops 14' extending from opposite ends of the endless vehicle track. The extending loops at each end are then looped around a wedge-shaped rod 50 which includes recessed portions 51 for receiving the belt loops. The two ends of the endless vehicle track are then brought into abutment, and the rods 50 with the belt loops 14' are slid into an H-shaped link 52 which includes wedge-shaped recesses 53 which are shaped and sized to receive rods 50 and belt loops 14', preferably in a snug fit. An end cap 54 is provided at at least one end of link 52 to retain rods 50 in link 52; the other end of link 52 may also include an end cap or may be integrally closed during manufacture. Each end cap 54 is fastened to link 52 with screws, bolts, or other conventional fasteners (not shown). Rail blocks 17, 18, drive pin 19 and/or supporting members 20 may be disposed on master link 52 in positions respectively corresponding to the positions of like elements on the endless vehicle track.

As an alternative to the master link shown in FIG. 9, the endless vehicle track of the present invention may be utilized in conjunction with a master link or joint assembly as disclosed in Applicants' other U.S. patents identified above, particularly U.S. Pat. Nos. 4,844,560 and 5,020,865. The grooved or recessed rods disclosed in those patents and in the embodiment of FIG. 9 herein could be comprised of a central rod (e.g., ½ inch O.D.) with washers (e.g., 1 inch O.D.) spaced apart thereon to thereby effectively create the grooves or recessed portions between the spaced washers. Of course, any such alternative master link may also include rail blocks, drive pin and/or supporting members as described above.

Figure 10A:
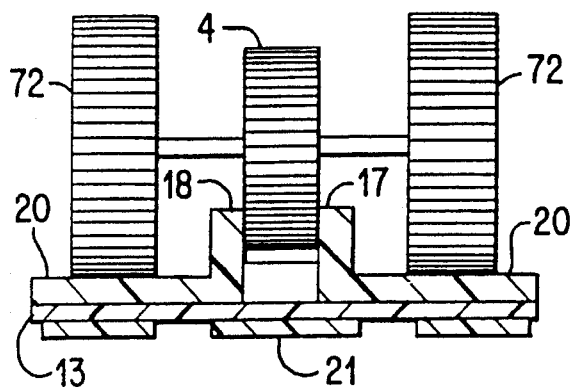
FIGS. 10A–10C depict various supplemental drive configurations for use in conjunction with the present invention.
Figure 10B:
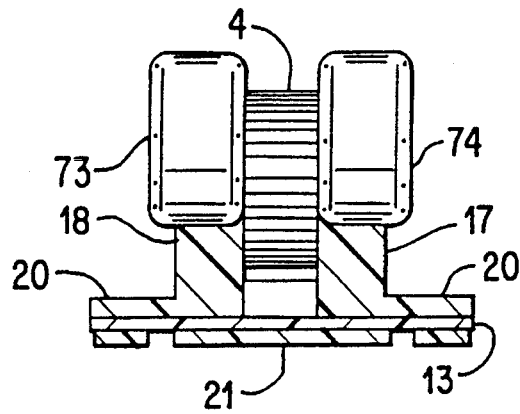
Figure 10C:
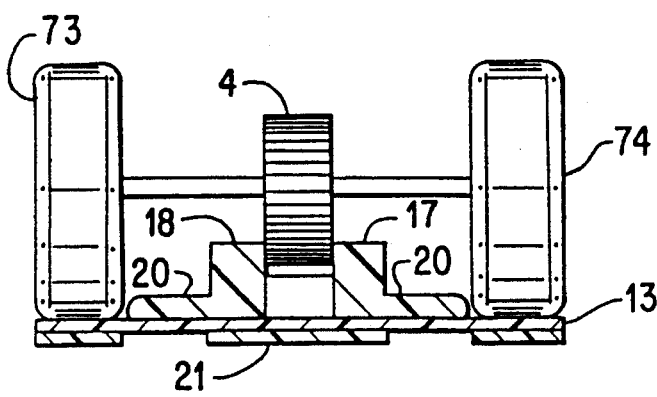

Once installed on a tracked vehicle, the endless vehicle track of the present invention is positively driven by engagement between the existing sprocket 4 and the drive pins or their bushings. However, it is possible to provide supplemental or alternative driving power for the tracked vehicle. For example, one or more supplemental sprockets 72 may be included for engaging with the supporting members 20 as shown in FIG. 10A. Additionally, one or more pneumatic drive wheels 73, 74 may be provided for frictionally engaging with the tops of the rail blocks and/or with the first surface of the drive belt as shown in FIGS. 10B and 10C. Other possibilities will be apparent to those skilled in the art on the basis of the foregoing disclosure.

Figure 12:
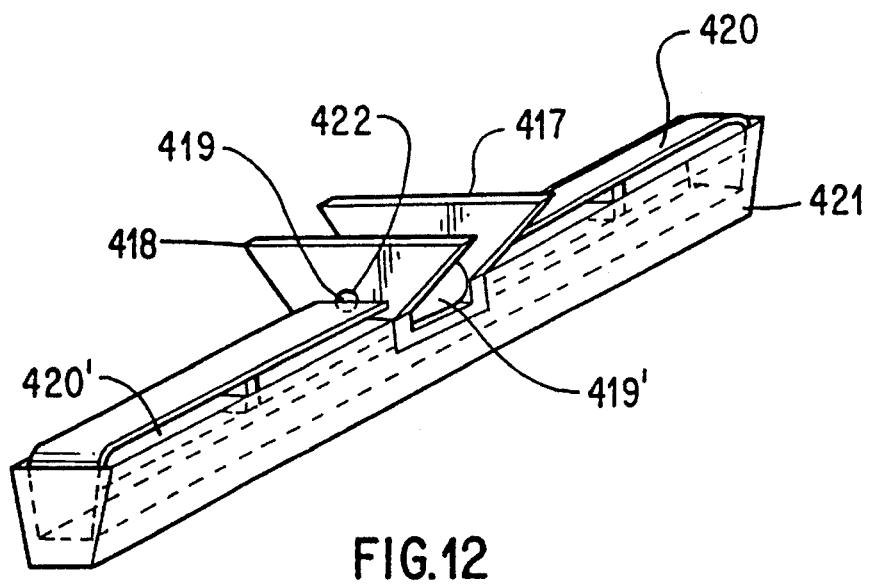
FIG. 12 is a perspective view of a portion of an alternative embodiment of the present invention.
Figure 13:
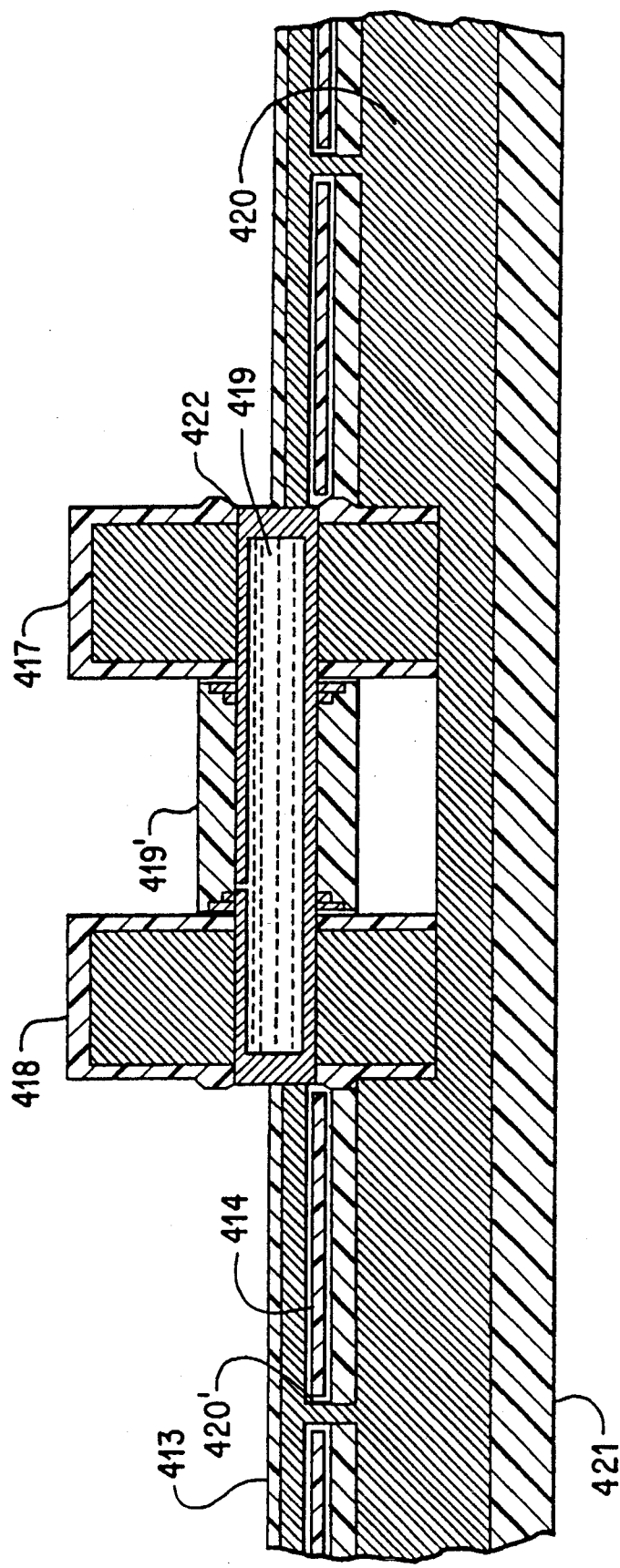
FIG. 13 is a lateral cross section of the FIG. 12 embodiment of the present invention.
Figure 14:
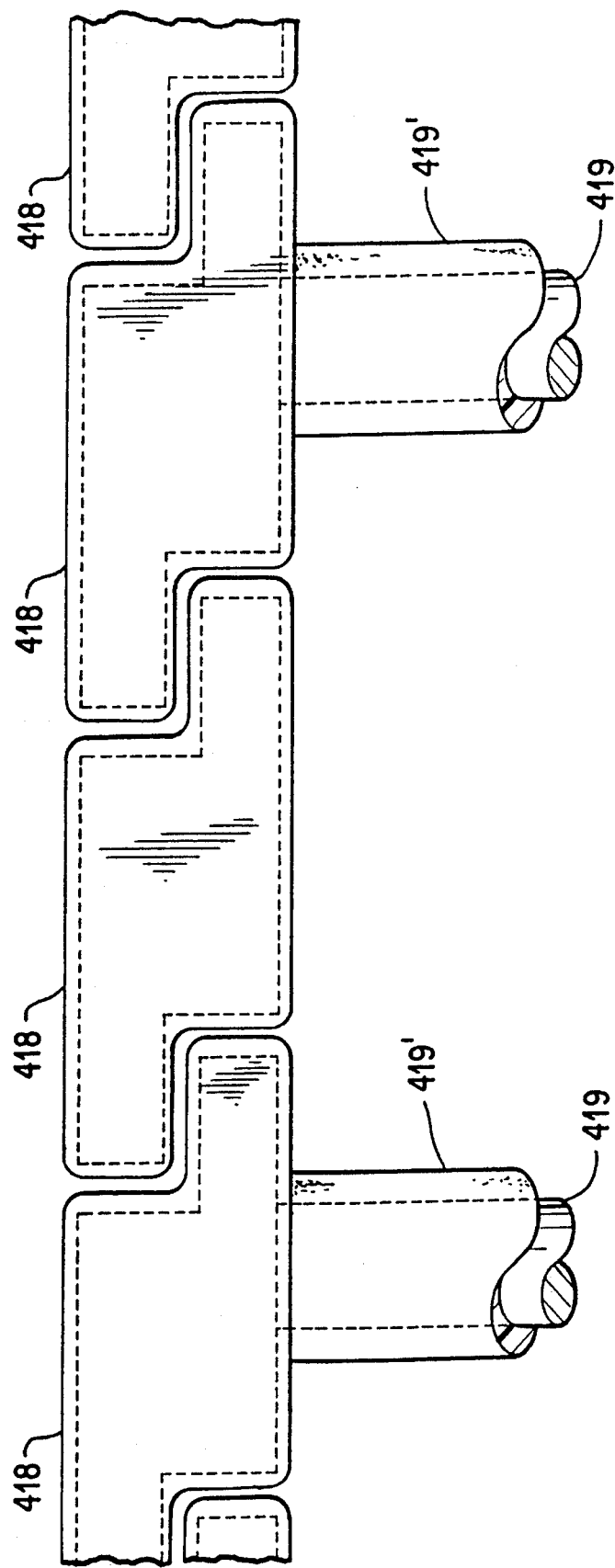
FIG. 14 is a partial plan view of the endless vehicle track of the FIG. 12 embodiment of the present invention.

In an alternative embodiment, with reference to FIGS. 12–14, a pair of metal rail blocks 417, 418, by way of example ½ to 1 inch wide steel, are welded or otherwise fastened to a metal (e.g., steel) supporting member 420. The rail blocks may be polymeric coated as shown in FIG. 13, or may be utilized without any polymeric coating. The supporting member 420 includes a plurality of slots 420' adapted to receive reinforcement members 414 prior to molding of the drive belt. Similar to the earlier embodiments described above, a drive pin 419 is press fitted directly into apertures 422 in rail blocks 417, 418, and a bushing 419' (metal, polymeric or polymeric coated metal) is provided over the drive pin for engaging with the sprocketed drive wheel of the tracked vehicle.

Apertures 422 of rail blocks 417, 418 are preferably offset from a central vertical axis of the rail blocks. By means of the offset apertures, two parallel sets of overlapping rail blocks can be achieved with the manufacture of a single rail block type (by simply reversing the orientation of opposing rail blocks), while minimizing the necessary size of overlapping portions and consequent material waste during manufacture.

During manufacture, each individual assemblage of rail blocks, supporting member, drive pin and bushing is coated at the bottom with a polymeric material (preferably a relatively hard polyurethane) with the reinforcement member receiving slots 420' exposed to thereby form a tread member 421, as depicted in FIG. 12. A plurality of the rail block/supporting member/drive pin/bushing assemblages are then placed side by side, with appropriate reinforcement members 414 through the respective slots 420' of the respective supporting members, and the drive belt 413 is molded around the reinforcement members 414 and the upper portions of the supporting members 420 as best depicted in FIG. 13. As described above with reference to earlier embodiments, the drive belt is preferably formed of a polymeric material which is relatively softer than the material utilized to form treads 421 or any material utilized to coat rail blocks 417, 418 and bushings 419'. Similar to the earlier described embodiments, the vehicle track can be formed in a single molding step or multiple molding steps. Likewise, the endless vehicle track of this embodiment may be molded in a closed loop, or alternatively may have two abutting ends joined together by a master link as previously described.

Figure 15:
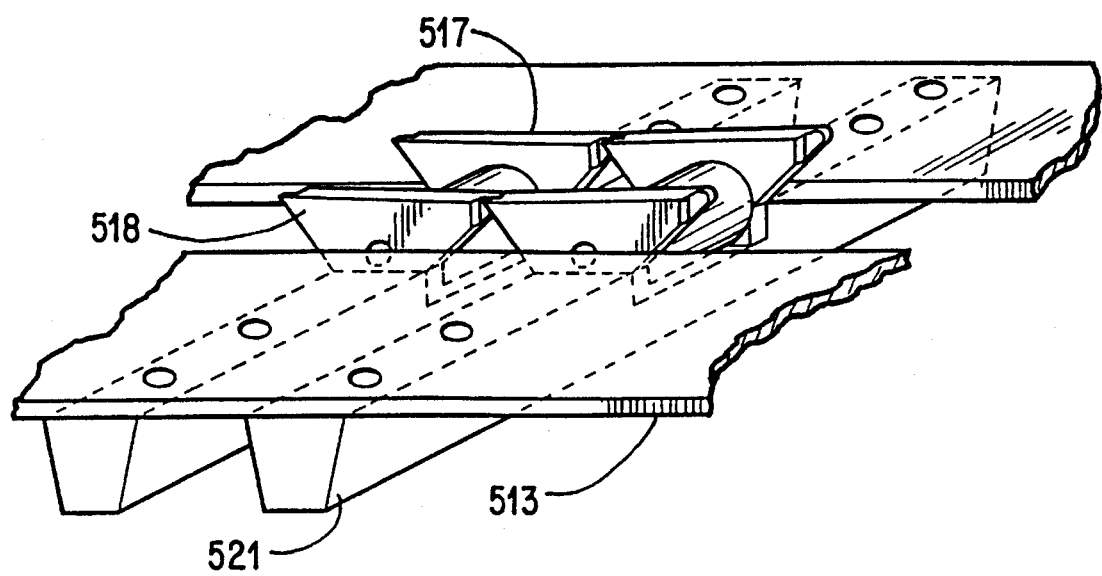
FIG. 15 is a perspective view of portions of yet another embodiment of the present invention.
Figure 16:
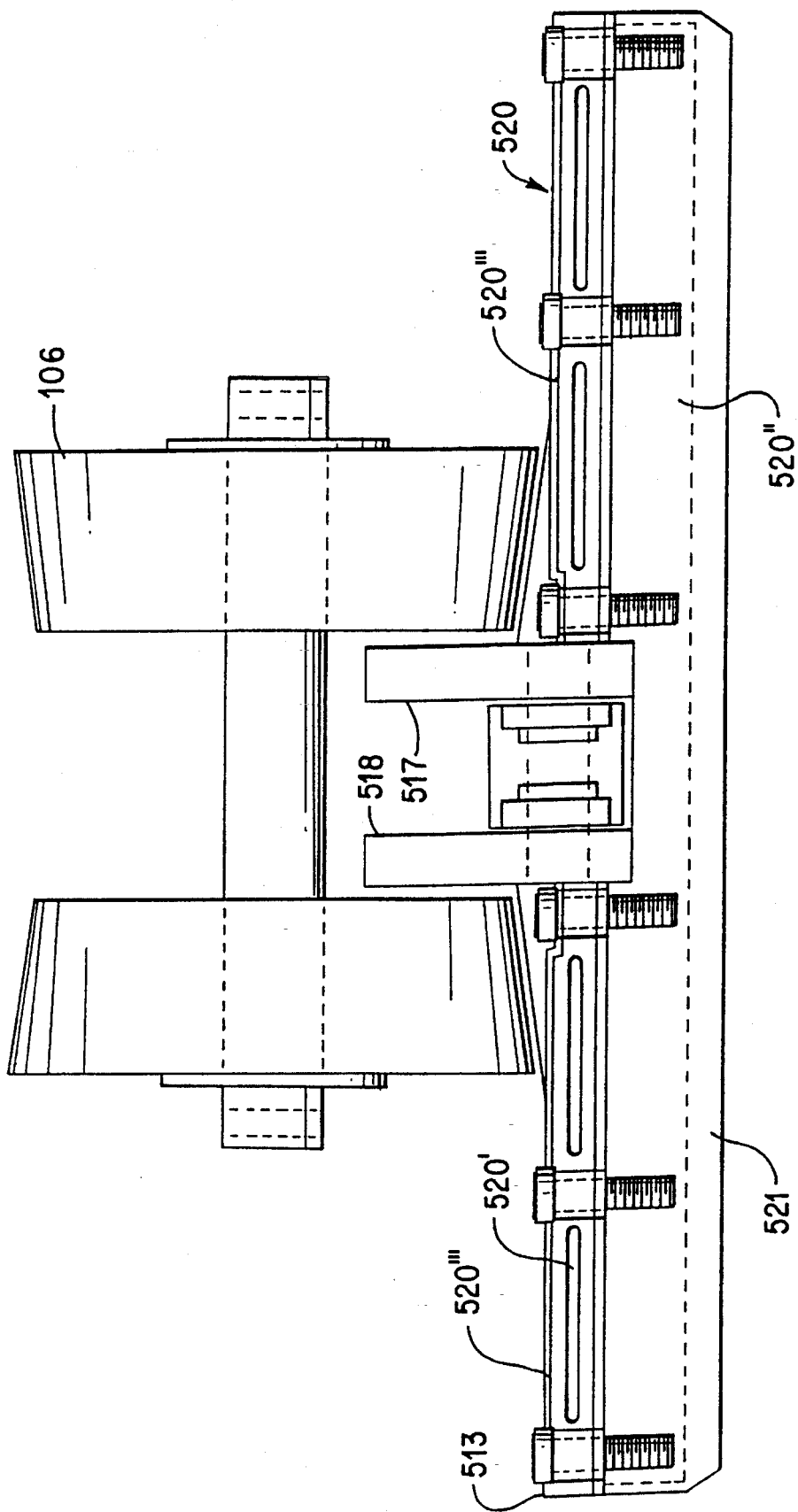
FIG. 16 is an elevation view of the FIG. 15 embodiment showing widened rollers.

In a modified version of this alternative embodiment, with reference to FIGS. 15 and 16, supporting members 520 include a lower (tread) portion 520" and two upper (drive belt) portions 520'" (each with reinforcement member receiving slots 520'), which are adapted to be bolted together as best shown in FIG. 16. As can be seen from the drawings, a tread 521 is molded around lower portion 520'" of supporting member 520. Similarly, drive belt 513 is molded around upper portions 520'" of supporting member 520. Drive belt 513 is then bolted to respective tread members 521 to form the endless vehicle track. In this modified version of the alternative embodiment, rail blocks 517, 518 are welded or otherwise fastened to lower portion 520" of supporting member 520.

In the embodiments of FIGS. 12–16, the drive belt is preferably comprised of two parallel portions as shown. The upper surface (i.e., rail block side) of the drive belt is smooth, since it does not include surface mounted supporting members 20 of the first embodiment. The upper surface of the drive belt in these embodiments may be flat or tapered outwardly from the rail blocks. The taper may be a partial taper as depicted in FIG. 16, or the drive belt may be continuously tapered from the respective rail block to the outer lateral edge of the drive track. In the case of a partial taper, a reverse partial taper may be provided at the outer lateral end of each drive belt portion so that the drive belt portions can be removed, flipped end for end, and reversed in the event of excessive wear on the tapered surfaces. It is also preferable that the horizontal axis of the drive belt be aligned with or substantially aligned with the horizontal axes of the various drive pins, to avoid undesirable stretching or compressing of the drive belt during use.

In the embodiments of FIGS. 12–16, the entire endless vehicle track may be constructed of a single polymeric material or multiple polymeric materials as described above with reference to earlier embodiments. In either event, it is preferable to maintain a tread hardness of 90–95 durometers (A scale), and an overall track hardness in the range of 70–95 durometers (A scale). This may be accomplished through the use of the previously identified polyurethane materials. Alternatively, the drive belt, for example, may be made of B-602 polyurethane manufactured by Uniroyal Chemical Company, or the entire vehicle track may be made of PCA 422 polyurethane manufactured by Polyurethane Specialties Co., Inc.

Figure 17:
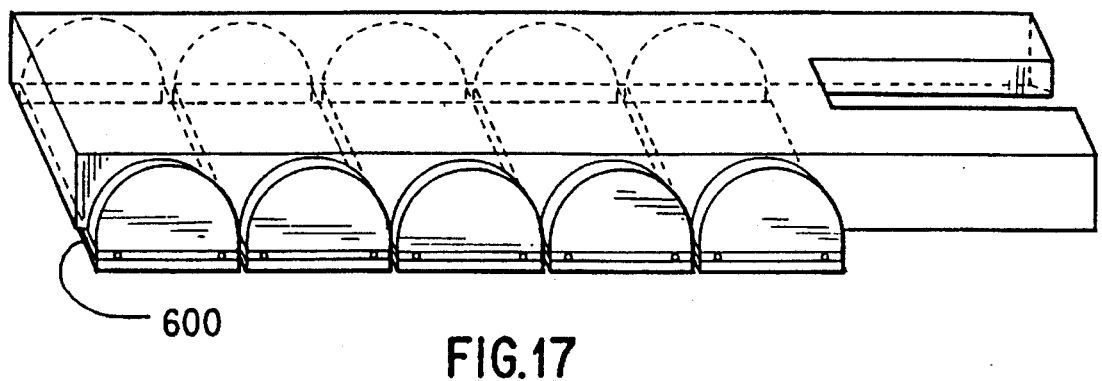
FIG. 17 is a perspective view of a tracked vehicle frame adapted with extenders to accommodate the widened rollers of FIG. 16.
Figure 18:
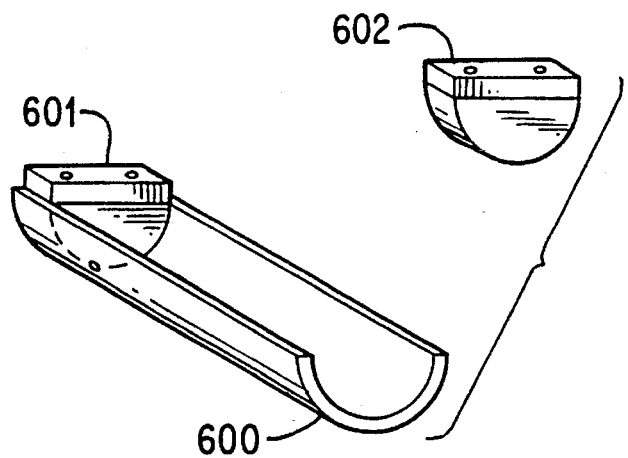
FIG. 18 is a perspective view of one of the extenders of FIG. 17.

In conventional rail-type track vehicles, the metal rollers (FIG. 1, reference numeral 6) typically ride atop the rail blocks, resulting in an additional source of undesirable noise and excessive wear. To reduce noise, the metal rollers may be replaced with standard width, polymeric or polymeric coated rollers requiring no modification of the vehicle frame. In order to provide for an even smoother, quieter and more durable operation, the standard metal rollers 6 may alternatively be replaced with metal, polymeric or polymeric coated metal rollers 106 (see FIG. 16) which ride on the upper surface of the drive belt instead of atop the rail blocks. In order to accommodate these widened rollers, roller mounting extenders 600 (FIGS. 17, 18) are bolted or otherwise fastened to portions of the vehicle frame which have been correspondingly cut out to accommodate the extenders, and the widened rollers are then bolted or otherwise fastened to flanges 601 of the extenders. If it is later desired to use the standard width rollers (metal, polymeric or polymeric coated metal) with the modified frame, adaptors 602 may be removably fastened to extenders 600, as shown in FIG. 18. Of course, rollers 106 can be flat or tapered, to match the upper surface of the corresponding drive belt with which they are to be utilized.

Figure 21:
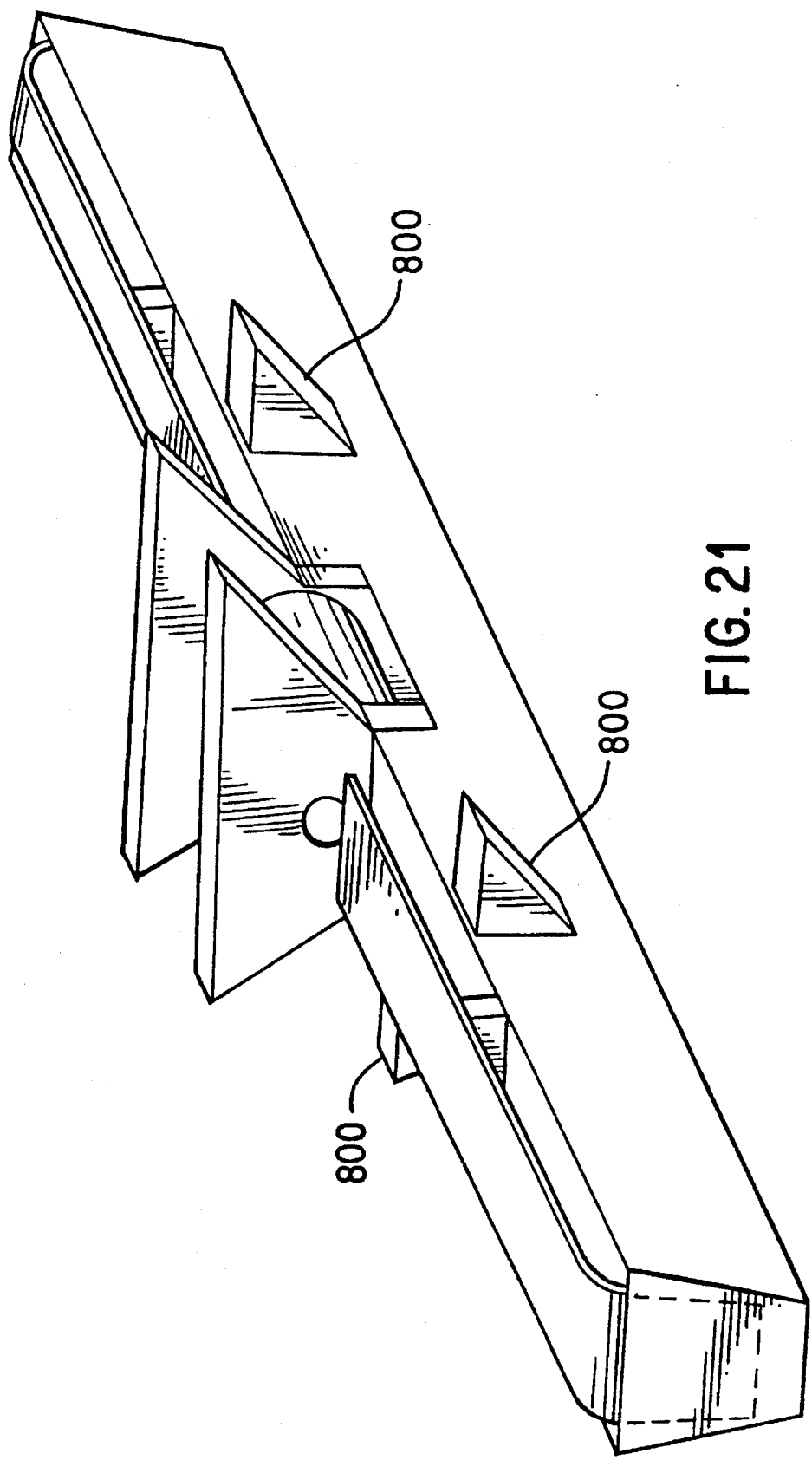
FIG. 21 is a perspective view of a portion of the FIG. 12 embodiment showing auxiliary supporting members.

To avoid stretching of the drive belt by the widened rollers between supporting members, polymeric auxiliary supporting members 800 may be included between the supporting members as shown in FIG. 21 (preferably under or substantially under the rollers). As shown, two auxiliary supporting members protrude from each side of a drive tread, and are offset from overlapping auxiliary supporting members protruding from an adjacent drive tread, so as to provide both freedom of movement and auxiliary support for the widened rollers. The auxiliary supporting members are preferably made of a relatively hard polymeric material integrally molded with the drive tread, and may be steel reinforced. The auxiliary supporting members preferably have flat upper surfaces directly adjacent the lower surface (drive tread side) of the drive belt, and are tapered downwardly to the drive tread as shown.

Figure 19:
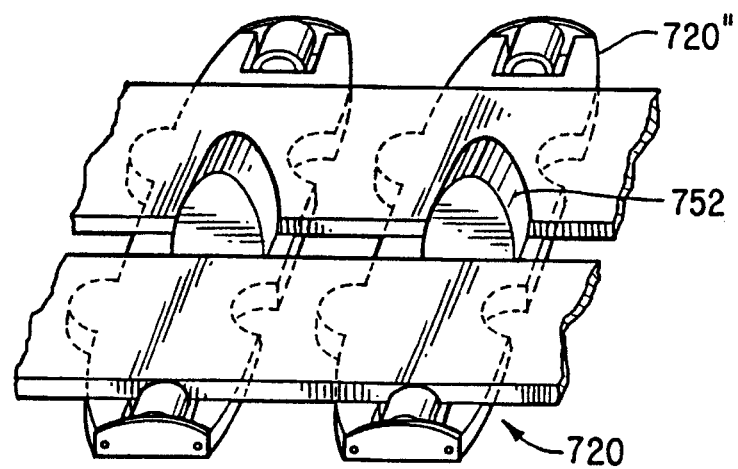
FIG. 19 is a perspective view of portions of still another embodiment of the present invention.
Figure 20:
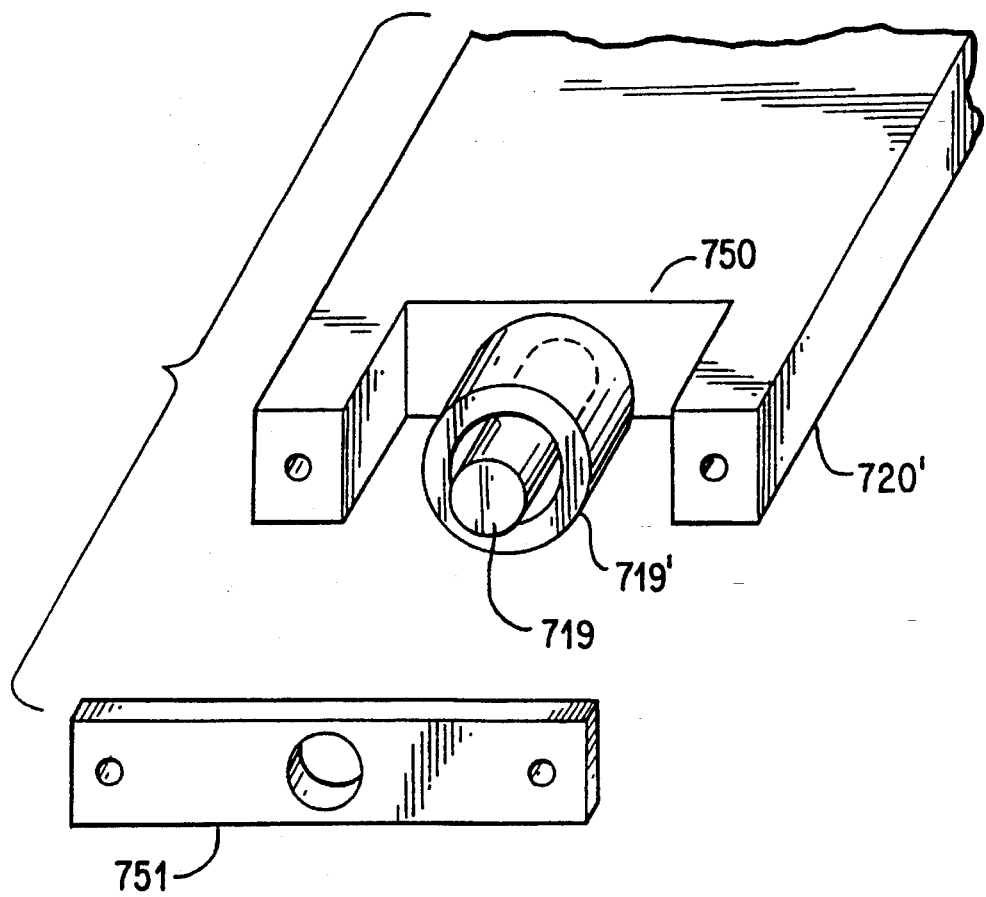
FIG. 20 is a perspective view of the drive pin and bushing arrangement of the FIG. 19 embodiment of the present invention.

With reference to FIGS. 19 and 20, the present invention may be even further modified for use on track vehicles, such as tanks, which incorporate drive sprockets which engage with lateral end portions of the drive track. This embodiment may be constructed similarly to the embodiments of FIGS. 12–16, except that the lower portions 720" of supporting members 720 are widened to accommodate drive pins 719 and bushings 719' at their lateral end portions. More particularly, the lateral ends of the lower portion 720" of each supporting member 720 include cut out portions 750. Drive pins 719 are press fitted into apertures in lower portion 720'" of each supporting member 720 and cap members 751, the latter being bolted or otherwise detachably fastened to lower portion 720" such that bushing 719' is free to rotate (if preferred) and is further engageable with the sprocketed drive wheel. Metal, polymeric or polymeric coated metal guide members 752 are fastened to central portions of supporting members 720 to maintain lateral positioning of the endless vehicle track.

Figure 22:
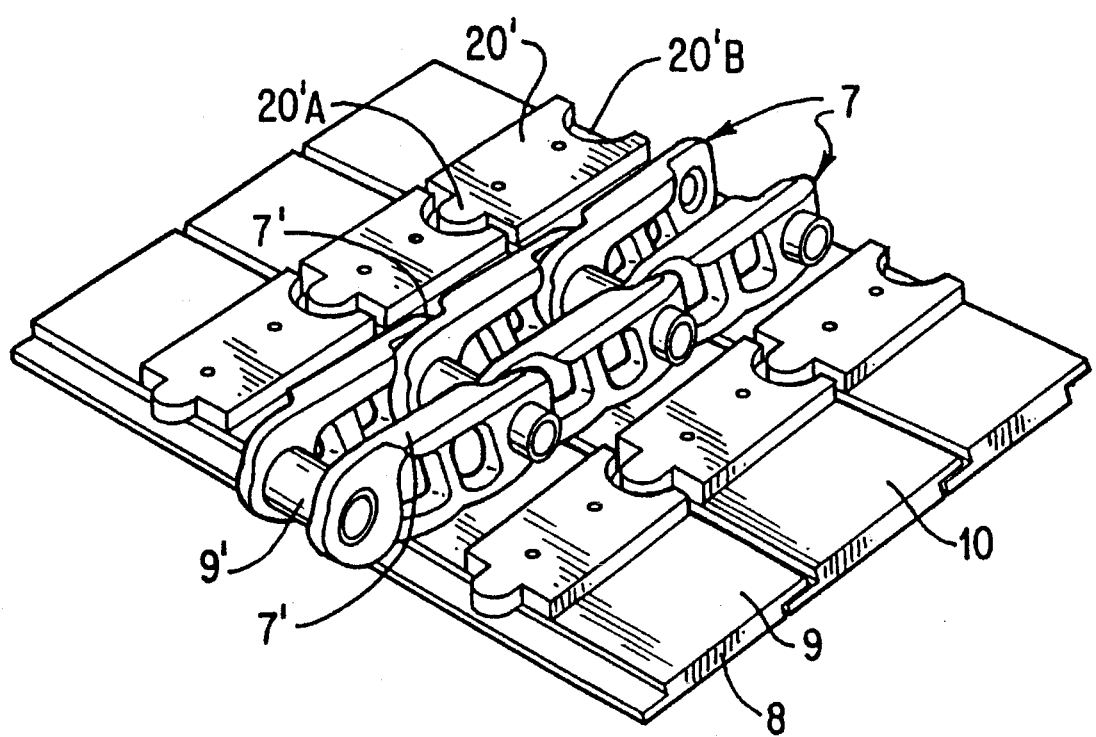
FIG. 22 is a perspective view of yet another embodiment of the present invention.
Figure 23:
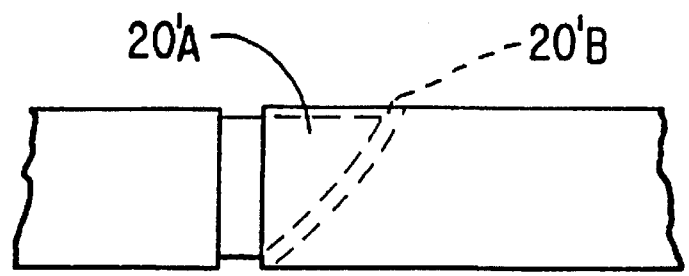
FIG. 23 is a side elevational view of the tab and slot arrangement of the FIG. 22 embodiment.

In yet another alternative embodiment, referring to FIGS. 22 and 23, a conventional endless track can be modified to accommodate the widened, metal, polymeric or polymeric coated metal rollers 106 illustrated in FIG. 16. As described in connection with FIG. 2, the endless track includes two parallel rails 7 each comprised of a plurality of rail blocks 7' linked together and supporting a plurality of metal grousers 8. Metal drive pins 9 between opposing rail blocks are engaged by the drive wheel sprocket to propel the vehicle. Drive pins 9 are driven into and retained by press fittings 10 in the rail blocks. Replaceable protective metal bushings 9' may be provided around drive pins 9 to protect the drive pins from wear, and a lubricant may be injected between drive pins 9 and bushings 9' from reservoirs in drive pins 9 to reduce friction. Attached to each of the metal grousers 8 are a pair of supporting pads 20' made of a polymeric material such as polyurethane. Pads 20' are fixed to grousers 8 by any suitable means, such as by molding or by bolts received in threaded holes in the grousers or in nuts on the other side of the grousers. Pads 20' may be flat or tapered outwardly from the rail blocks as described above with reference to the drive belt of FIGS. 12–16. Rollers 106 are widened and ride on the supporting pads 20'. This pad and roller arrangement enables a conventional endless track to be modified for smoother, quieter and more durable operation.

At one end of each of supporting pads 20' is a tab 20'A. The tab 20'A is adapted to be received in (engaged with) a corresponding slot 20'B of an adjacent pad 20'. As shown in FIG. 23, tab 20'A and slot 20'B are correspondingly tapered with respect to each other, preferably such that slot 20'B tapers from a top surface to a bottom surface toward the tab 20'A of an adjacent pad wherein the widest part of the tapered portion faces the rollers 106, and tab 20'A tapers from a top surface to a bottom surface of the pad toward the slot 20'B of the same pad. The tapered slot provides sufficient space for pivotal movement of the tab, thereby avoiding contact with the adjacent pad when the endless track is turning around the drive wheel or opposite end wheel.

Figure 24:
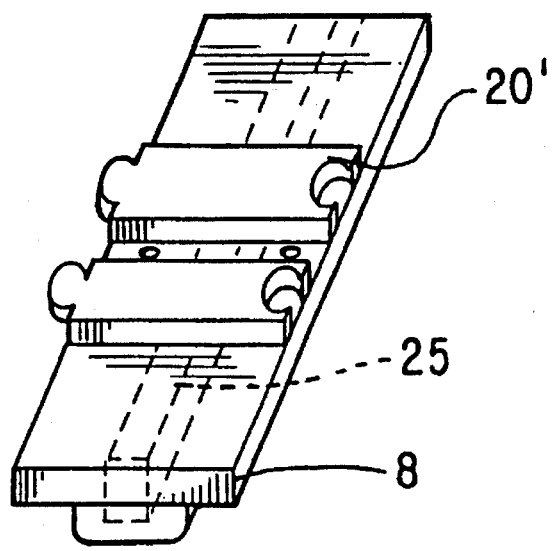
FIG. 24 is a perspective view of a modification of the FIG. 22 embodiment.

Referring to FIG. 24, grouser 8 may be coated with or formed completely of a polymeric material such as polyurethane. A reinforcing member 25 formed of a strong material, such as steel, is disposed within the grouser 8. Supporting pads 20' are fixed to grouser 8 in a manner similar to that described above in connection with FIG. 22. In addition, supporting pads 20' may be formed integral with grouser 8.

Thus, while only certain embodiments of the invention have been specifically described herein, it will be apparent that numerous modifications may be made thereto without departing from the spirit and scope of the invention.

What is claimed is:

1. An endless track for an endless track vehicle, said endless track comprising:

at least one metal grouser;

a pair of parallel rails, each of said rails comprising a plurality of rail blocks, said metal grouser being fixed to ones of said rail blocks; and at least one roller supporting pad fixed to said metal grouser, said supporting pad engaging with an adjacent supporting pad.

2. The endless track of claim 1, wherein said supporting pad is molded to said grouser.

3. The endless track of claim 1, wherein said supporting pad is fixed to said grouser with bolts.

4. The endless track of claim 1, wherein said supporting pad is made of a polymeric material.

5. The endless track of claim 1, wherein said supporting pad comprises a tab at a first end and a slot at a second end, said tab protruding in a direction parallel to said rails and shaped to fit inside a corresponding slot of said adjacent supporting pad.

6. The endless track of claim 5, wherein said slot tapers from a top surface to a bottom surface in a direction from the first end of said supporting pad toward the second end of said supporting pad, respectively, and said tab correspondingly tapers from a top surface to a bottom surface from the first end of said supporting pad toward the second end of said supporting pad, respectively.

7. A supporting pad adapted to be fixed to a grouser of an endless track of an endless track vehicle and to support a roller that guides the track, said supporting pad comprising:

a front end and a rear end;

means for fixing said supporting pad to said grouser; and means for engaging an adjacent supporting pad such that a portion of said pad extends from one of said front end and said rear end and past the other of a front end and a rear end of said adjacent supporting pad and within said adjacent supporting pad.

8. The supporting pad of claim 7, wherein said fixing means comprises supporting said pad being molded member to said grouser.

9. The supporting pad of claim 7, wherein said fixing means comprises bolts.

10. The supporting pad of claim 7, wherein said supporting pad is made of a polymeric material.

11. The supporting pad of claim 7, wherein said supporting pad comprises a tab at a first end and a slot at a second end, said tab protruding in a first direction and shaped to fit inside a corresponding slot of said adjacent supporting pad.

12. The supporting pad of claim 11, wherein said slot tapers from a top surface to a bottom surface in a direction from the first end of said supporting pad toward the second end of said supporting pad, respectively, and said tab correspondingly tapers from a top surface to a bottom surface from the first end of said supporting pad toward the second end of said supporting pad, respectively.

13. An endless track for an endless track vehicle, said endless track comprising:

a plurality of grousers;

a pair of parallel rails, each of said rails comprising a plurality of rail blocks, said grousers being linked to one another by said rail blocks; and a pair of roller supporting pads fixed to each of said grousers.

14. The endless track of claim 13, wherein said supporting pads are fixed to said grousers by bolts.

15. The endless track of claim 13, wherein said grousers are formed of a polymeric material and include a reinforcing member.

16. The endless track of claim 15, wherein said supporting pads are integral with said grousers.

17. The endless track of claim 15, wherein said reinforcing member is a steel bar disposed within said polymeric grousers.

18. An endless track for an endless track vehicle, said endless track comprising:

at least one metal grouser;

a pair of parallel rails, each of said rails comprising a plurality of rail blocks, said metal grouser being fixed to ones of said rail blocks; and at least one roller supporting pad fixed to said metal grouser, said supporting pad, together with an adjacent supporting pad, providing a substantially continuous pad surface, wherein said supporting pad comprises a front end and a rear end, and wherein a portion of said pad extends from one of said front end and said rear end and past the other of a front end and a rear end of said adjacent supporting pad and within said adjacent supporting pad.

19. An endless track drive system for a tracked vehicle, said system comprising:

at least one metal grouser;

a pair of parallel rails, each of said rails comprising a plurality of rail blocks, said metal grouser being fixed to ones of said rail blocks;

at least one roller for guiding the track; and at least one supporting pad fixed to said metal grouser, said roller riding on said supporting pad, said supporting pad engaging with an adjacent supporting pad.

20. An endless track drive system for a tracked vehicle, said system comprising:

at least one metal grouser;

a pair of parallel rails, each of said rails comprising a plurality of rail blocks, said metal grouser being fixed to ones of said rail blocks;

at least one roller for guiding the track; and at least one supporting pad fixed to said metal grouser, said roller riding on said supporting pad, said supporting pad, together with an adjacent supporting pad, providing a substantially continuous pad surface, wherein said supporting pad comprises a front end and a rear end, and wherein a portion of said pad extends from one of said front end and said rear end and past the other of a front end and a rear end of said adjacent supporting pad and within said adjacent supporting pad.

21. An endless track drive system for a tracked vehicle, said system comprising:

a plurality of grousers;

a pair of parallel rails, each of said rails comprising a plurality of rail blocks, said grousers being linked to one another by said rail blocks;

a plurality of rollers for guiding the track; and a pair of supporting pads fixed to each of said grousers, said rollers riding on ones of said supporting pads, said supporting pads, together with adjacent supporting pads, providing a substantially continuous pad surface.

* * * * *